US011299353B2

(12) United States Patent
Cofler et al.

(10) Patent No.: US 11,299,353 B2
(45) Date of Patent: Apr. 12, 2022

(54) CONVEYORS INTERFACING SYSTEM AND METHOD

(71) Applicant: VELOX-PUREDIGITAL LTD., Rosh Ha'ayin (IL)

(72) Inventors: Marian Cofler, Kfar Yona (IL); Avi Feinschmidt, Holon (IL); Itay Raz, Mazkeret Batia (IL); Adrian Cofler, Gan Yavne (IL); Yaakov Levi, Kfar Yona (IL)

(73) Assignee: VELOX-PUREDIGITAL LTD., Hamelacha (IL)

( * ) Notice: Subject to any disclaimer, the term of this patent is extended or adjusted under 35 U.S.C. 154(b) by 0 days.

(21) Appl. No.: 16/967,865

(22) PCT Filed: Feb. 18, 2019

(86) PCT No.: PCT/IL2019/050191
§ 371 (c)(1),
(2) Date: Aug. 6, 2020

(87) PCT Pub. No.: WO2019/159179
PCT Pub. Date: Aug. 22, 2019

(65) Prior Publication Data
US 2021/0047131 A1  Feb. 18, 2021

(30) Foreign Application Priority Data
Feb. 18, 2018 (IL) .......................................... 257582

(51) Int. Cl.
*B65G 47/08* (2006.01)
*B65G 17/00* (2006.01)
(Continued)

(52) U.S. Cl.
CPC ......... *B65G 47/082* (2013.01); *B65G 17/002* (2013.01); *B65G 47/715* (2013.01); *B65G 47/82* (2013.01)

(58) Field of Classification Search
CPC ...... B65G 47/71; B65G 47/08; B65G 47/084; B65G 47/082; B65G 17/002; B65G 47/715; B65G 47/82
(Continued)

(56) References Cited

U.S. PATENT DOCUMENTS 1,935,409 A     11/1933   Mudd
2,881,575 A  *   4/1959   Day ........................ B65B 21/16
                                                                 53/493
(Continued)

FOREIGN PATENT DOCUMENTS

CN      201023667 Y     2/2008
CN      202935912 U     5/2013
(Continued)

*Primary Examiner* — James R Bidwell
(74) *Attorney, Agent, or Firm* — Dorsey & Whitney LLP

(57) ABSTRACT

A system for interfacing between different types of conveyor systems that comprise a first serial conveyor system using a sequence of object carriers configured to transport a continuous serial stream of objects, and a parallel conveyor system configured to simultaneously transport one or more arrays of objects. A first accumulator unit can be used to accumulate a batch of the object carriers of the first serial conveyor system. Each of the object carriers can carry an object of the continuous serial stream of objects for accumulating a batch of the objects therein. Two or more first movable trays, each configured to receive an array of the objects from the batch of objects accumulated in the first accumulator unit, can be used to transfer the received array (Continued)

of objects to the parallel conveyor system, and load the objects thereby carried onto grippers of the parallel conveyor system.

40 Claims, 14 Drawing Sheets

(51) Int. Cl.
*B65G 47/71* (2006.01)
*B65G 47/82* (2006.01)

(58) Field of Classification Search
USPC .................................................. 198/426, 431
See application file for complete search history.

(56) References Cited

U.S. PATENT DOCUMENTS

| | | | |
|---|---|---|---|
| 3,415,354 A | | 12/1968 | Victor et al. |
| 3,994,386 A | * | 11/1976 | Toby ........................ B65B 35/42 |
| | | | 198/418.1 |
| 4,142,626 A | | 3/1979 | Bradley |
| 4,311,230 A | | 1/1982 | Crawford et al. |
| 4,325,475 A | | 4/1982 | Spalding |
| 5,018,334 A | | 5/1991 | Guttinger et al. |
| 5,261,522 A | | 11/1993 | Guttinger et al. |
| 5,611,418 A | | 3/1997 | Helmstetter |
| 5,638,659 A | | 6/1997 | Moncrief et al. |
| 5,897,291 A | | 4/1999 | Gerwe et al. |
| 6,170,634 B1 | | 1/2001 | Jaquet |
| 8,066,468 B2 | | 11/2011 | Klein et al. |
| 8,583,279 B2 | | 11/2013 | Fecht |
| 9,008,831 B1 | | 4/2015 | Jacobs et al. |
| 9,505,562 B2 | | 11/2016 | Petrovic |
| 9,663,305 B2 | | 5/2017 | Papsdorf |
| 2004/0132595 A1 | | 7/2004 | Grob |
| 2006/0131131 A1 | * | 6/2006 | Mayer .................... B65B 35/246 |
| | | | 198/436 |
| 2009/0000912 A1 | * | 1/2009 | Battles ................. B65G 1/1371 |
| | | | 198/431 |
| 2009/0049801 A1 | * | 2/2009 | Hagenbrock ........ B65G 47/907 |
| | | | 53/445 |
| 2012/0325622 A1 | | 12/2012 | Gatos |
| 2015/0165932 A1 | | 6/2015 | Maley |
| 2019/0077609 A1 | * | 3/2019 | Knobloch .............. B65G 47/82 |

FOREIGN PATENT DOCUMENTS

| | | |
|---|---|---|
| CN | 205739318 U | 11/2016 |
| DE | 3336531.8 C2 | 5/1987 |
| DE | 3720638 A1 | 1/1988 |
| DE | 102004008305 A1 | 9/2005 |
| EP | 0551613 A1 | 7/1993 |
| EP | 2960189 A1 | 12/2015 |
| GB | 2003824 A | 3/1979 |
| JP | 2004269203 A | 9/2004 |
| WO | 2015177599 A1 | 11/2015 |

* cited by examiner

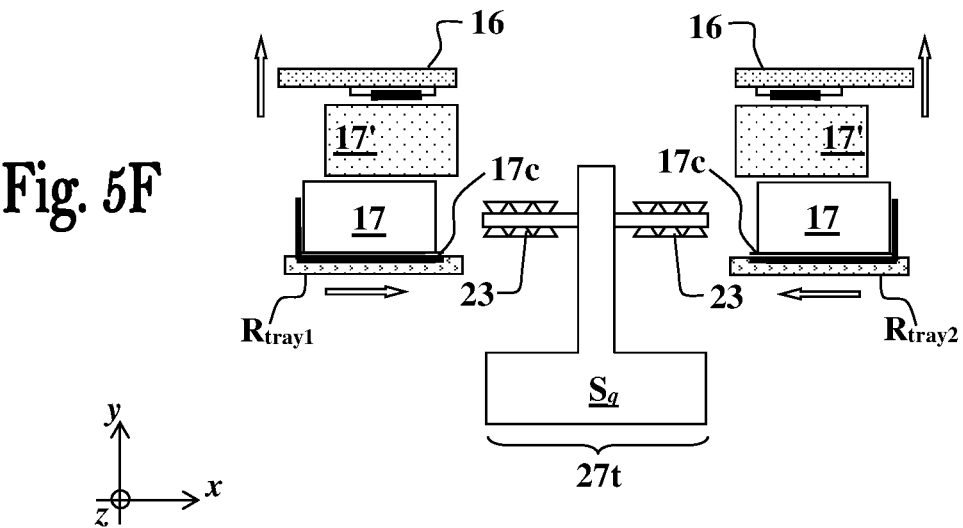
Fig. 5F
Fig. 5G
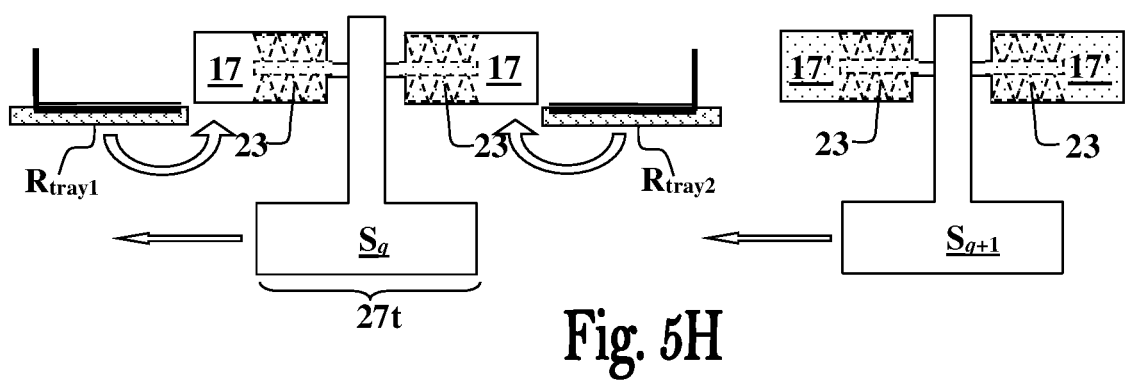
Fig. 5H

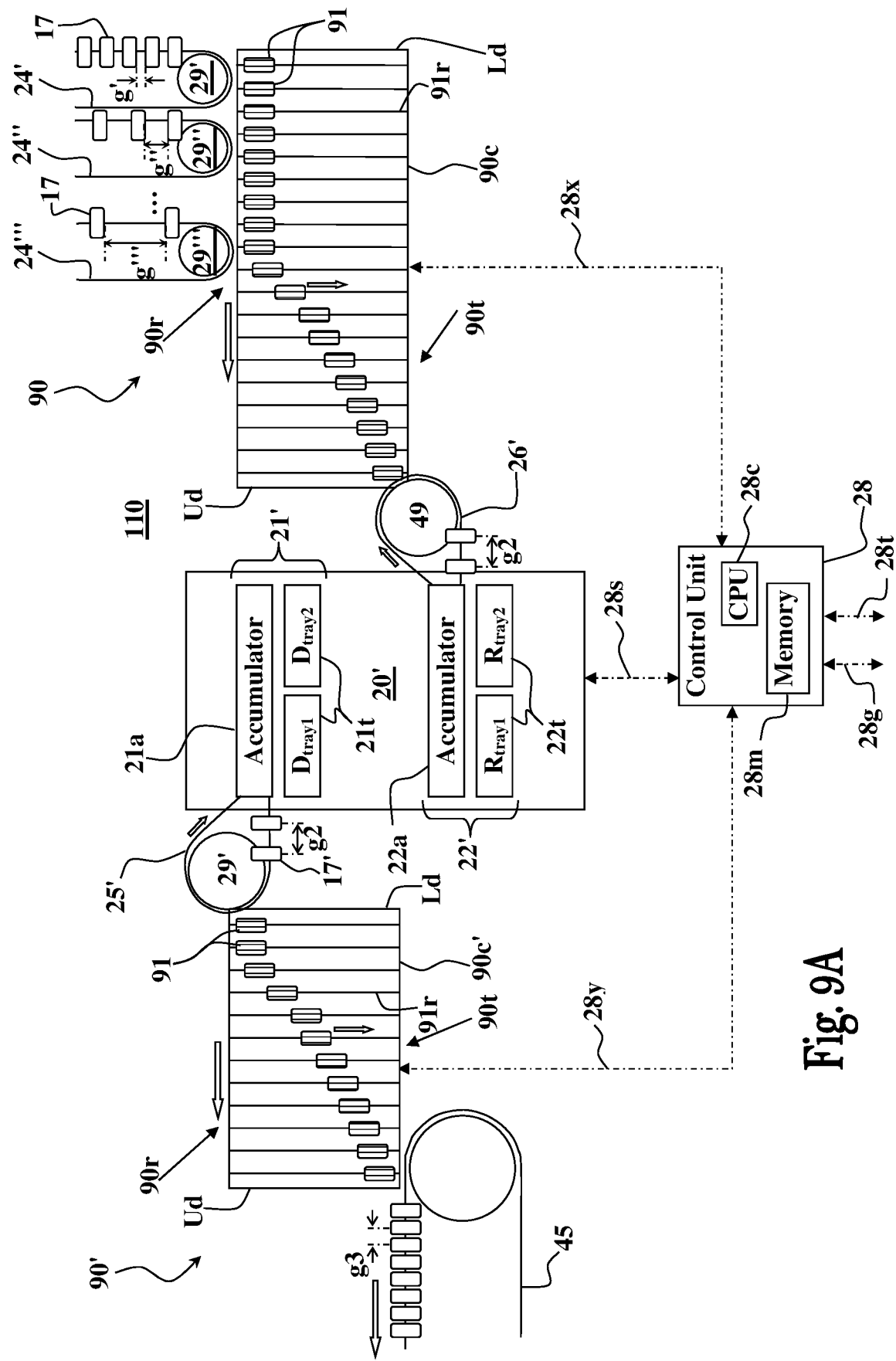

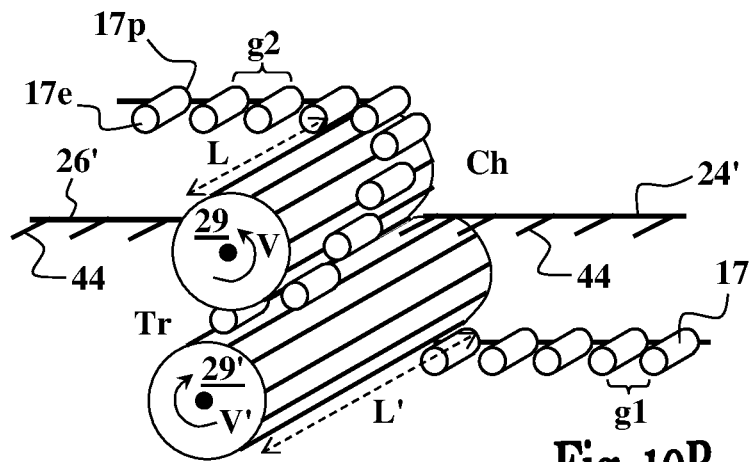
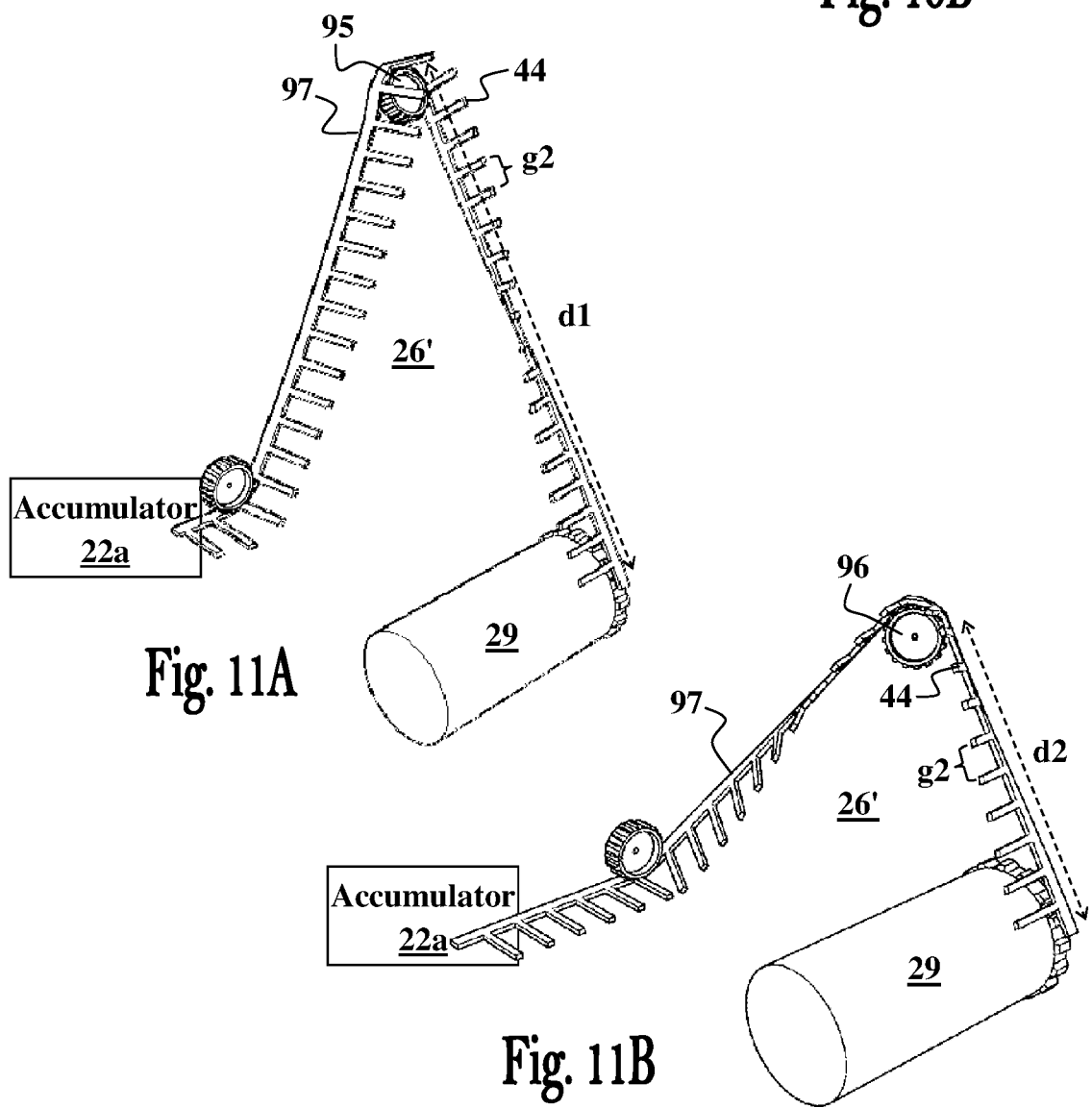
Fig. 10B
Fig. 11A
Fig. 11B

ND METHOD

TECHNOLOGICAL FIELD

The present invention is generally in the field of objects conveyors, and in particular relates to transferring objects between conveyors.

BACKGROUND

Conveyors are essential components of almost every production line and/or object processing/treatment line. Many systems utilizes two or more different independent conveyors, each of which is specially designed to serve a stream of objects for a specific production and/or object treatment/processing task (e.g., object formation, pre-paint/cleaning treatment, paint/print, labeling, packaging, and the like). There are many solutions known in the art for interfacing between different conveyors, for example, as described in U.S. Pat. Nos. 1,935,409, 4,325,475, 4,142,626, 5,018,334, EP 0551613, U.S. Pat. Nos. 5,611,418, 5,261, 522.

The control tasks and design complexity of the equipment used for interfacing between conveyors become substantially more demanding when the objects should be transferred between serial and parallel conveying machineries, and/or between machineries demanding different object paces/gaps. For example, when transferring objects from a serial conveyor to a parallel conveyor, the interfacing equipment is required to accumulate a batch of a predefined number of objects, adjust the pace/gaps between the accumulated batch of objects, and simultaneously transfer the accumulated and pace/gaps-adjusted batch of objects to the parallel conveyor, ideally without interrupting the continuous operations of the conveyors.

Some conveyors interfacing solutions know from the patent literature are briefly described hereinbelow.

U.S. Pat. No. 5,897,291 describes a method of forming arrays of articles, comprising: (a) providing a stacker having a plurality of compartments for receiving the articles, the stacker traveling along a closed loop path; (b) transporting a plurality of the articles along a first path to the stacker in sequential fashion; (c) introducing the articles into the compartments at an inlet position; (d) removing a first array of the articles from the stacker at a first stripping position by urging the articles from the compartment in a first stripping direction; (e) transporting the first array along a second path away from the stacker in a direction substantially opposite to the first stripping direction; and (f) repeating steps (b) through (e) for subsequent articles.

U.S. Pat. No. 8,583,279 describes a method and device for handling flat objects, particularly flat folded diapers, which are fed to a conveyor with receptacles for each object by a feeder, in particular to a compartment conveyor comprising separation struts which are arranged so as to protrude radially from a continuous conveyor in order to form compartments for each object. Provision is made for the speed at which the objects are transported on the feeder to be reduced for handover of the objects to the conveyor. The device includes a database in which respective data records containing transport speeds for a control unit being filed for different objects and/or objects of different size, the speed of the feeders being regulated by the control unit in accordance with the transport speed pertaining to the respective object.

US Patent Publication No. 2012/325622 relates to a machine for products having a non-circular cross-section, such as ovoid containers or bottles. The machine includes: a collector having cavities arranged obliquely relative to longitudinal axis of the conveyor used to supply said products; a means for transferring the batch of products formed into groups by said collector to a depositing station, on a table arranged along said feed conveyor; a means for dropping the batch of products by a reversing movement in an oblique direction; and a means for returning said collector to the starting point, that is, level with the first product on said feed conveyor.

GENERAL DESCRIPTION

There is a need in the art for machinery for interfacing between different types of conveyor systems having different object transport properties. The machinery typically used for interfacing between conveyors is not capable of adequately adjusting the gap/spacing between adjacently located objects when transferring the objects between one type of conveyor to another, nor of receiving a batch of serially fed objects and dividing it into a number of parallel arrays of objects and loading the same onto respective parallel object carriers of a parallel conveyor configured for conveying arrays of objects (also referred to herein as array conveyor/transporter).

The present application provides interfacing techniques, mechanisms and systems for transferring objects between different types of conveyors having different properties, such as, for example, different conveying rates/speeds and/or object-pace (gap spacing between adjacently located objects) and/or object carriers schemes (serial and/or parallel object conveyance). Interfacing systems disclosed herein are configured to transfer objects between different types of conveyor systems while adjusting the space/gaps between adjacently located objects and arranging the objects in structures complying with the requirements of each conveyor system.

In some embodiments the interfacing system is configured to transfer objects from a serial conveyor system to a parallel conveyor system. To perform such serial to parallel object transfer the interfacing system splits a batch of objects serially fed by the serial conveyor system into one or more arrays of objects, and loads the one or more arrays of objects onto the parallel conveyor system configured to transport arrays of the objects (also referred to herein as array transporter) for subjecting them to one or more treatment processes. The interfacing system is thus configured in some embodiments to accumulate a batch of objects fed by a serial conveyor system, remove the accumulated batch of objects from the serial conveyor system and transfer it as one or more arrays of objects to an array transporter.

The interfacing system can be configured in some embodiments to transfer objects from the parallel conveyor system to a dispatch (serial or parallel) conveyor system configured to transport the treated objects to another location/plant, and/or for further processing, and/or for packaging. If the dispatch conveyor system in a serial conveyor system, the interfacing system accumulates a batch of object carriers of the dispatch serial conveyor system, remove one or more arrays of objects from the array transporter and load them onto the accumulated batch of object carriers of the serial dispatch conveyor system as a serial batch of objects for serial transport thereby.

Optionally, and in some embodiments preferably, the interfacing system is configured to change the spacing/gaps between adjacently located objects received from a serial, or from a parallel, conveyor system. Particularly, the feed spacing/gaps between adjacently located objects of the batch of accumulated objects, which is defined by the serial conveyor system, is changed by the interfacing system into an object processing gap of the array transporter suited for application of the one or more treatment processes to the one or more arrays of objects. In some embodiments, when transferring objects from the parallel conveyor system to the dispatch conveyor system, the interfacing system is configured to remove one or more arrays of objects from the array transporter and change the spacing/gaps between objects adjacently located therein from the object processing gap into spacing/gaps required for loading the removed objects onto the dispatch conveyor system. The dispatch conveyor system configured to dispatch the (treated) objects received from the interfacing system e.g., to other machinery/equipment in a product manufacture line, and/or to another site/plant.

The interfacing system may thus comprise in some embodiments at least one accumulator unit configured to accumulate a batch of the objects fed by the serial conveyor, and at least one spacer unit configured to remove the accumulated batch of objects from the serial conveyor, change the spaces between objects adjacently located one to the other in the batch of objects fed by the serial conveyor system into an object processing gap dictated by the array transporter, and transfer the objects for loading onto the array transporter.

The at least one spacer unit can be configured to remove the objects from the serial conveyor system using an array of grippers and/or attractor units, or to receive the objects from the serial conveyor system using a pushing arm(s)/piston(s). The at least one spacer unit is configured in some embodiments to remove the objects from the serial conveyor by applying attraction forces on the accumulated batch of objects for attaching them thereto, and then move the removed objects attached thereto in sideway directions, apart or towards one the other, to thereby increase or decrease the spacing/gaps between the batch of removed objects. Optionally, and in some embodiments preferably, the spacer unit applies the attraction forces at least by vacuum.

When transferring objects from the parallel conveyor system to the dispatch serial conveyor, the interfacing system is configured in some embodiments to accumulate a batch of the object carriers of the dispatch serial conveyor, receive in the at least one spacer unit one or more arrays of objects from the parallel conveyor system arranged into a serial batch of objects, change the spaces between objects adjacently located one to other in the batch of objects received from the parallel conveyor from the object processing gap into a serial conveyor object gap defined by the dispatch serial conveyor system, and transfer the objects for loading onto the accumulated batch of object carriers of the dispatch serial conveyor system.

The interfacing system comprises in some embodiments one or more movable trays, each configured to hold an array of objects received from the spacer unit, move the array of objects towards the array transporter, and load the array of objects onto the array transporter. One or more movable trays can be similarly used to receive respective one or more arrays of objects loaded onto them from the array transporter, and move the loaded one or more arrays of objects to the spacer unit for transfer to the serial conveyor.

In possible embodiments the spacing/gaps between objects adjacently located in the stream of objects received from the serial conveyor a priori have the object processing gap dictated by the array transporter, and in such embodiments the spacer unit(s) is not required in the interfacing system. In such possible embodiments, where spacer unit(s) is not required/used, the interfacing system is configured to load the accumulated batch of objects from the accumulator unit directly onto one or more movable trays.

In alternative embodiments, a space adjustment system (also referred to herein as intermediating system) is used to receive the serial stream of objects fed by the serial conveyor system, adjust the spacing/gaps between the received objects into the object processing gap dictated by the array transporter, and transfer the objects to the interfacing system as a serial stream of objects having the object processing gap of the array transporter. Optionally, and in some embodiments preferably, the space adjustment system is configured to receive a plurality of streams of objects from a respective plurality of serial conveyors, each serial conveyor system having a different (or same) spacing/gaps between adjacently located objects thereby conveyed, adjust the spacing/gaps between the received objects into the object processing gap dictated by the array transporter, and transfer the objects to the interfacing system as a serial stream of objects having the object processing gap of the array transporter. In such alternative embodiments, employing the space adjustment system to intermediate between the serial conveyor system(s) and the interfacing system, spacer unit(s) are not required for changing the spacing/gaps between the objects in the accumulated batch of objects from the accumulator, and the interfacing system is configured to load the accumulated batch of objects from the accumulator unit directly onto one or more movable trays.

In some embodiments the array transporter/conveyor comprises a plurality of support platforms, each support platform configured to receive and transport one or more arrays of objects through the one or more objects treatments/processes. Each support platform comprises one or more arrays of grippers, each gripper configured to hold an object, and the one or more movable trays of the interfacing system are each configured to load the array of objects thereby carried onto a respective array of grippers of a support platform. The support platforms, and/or the grippers used therein to carry the one or more arrays of objects, can be implemented by embodiments described and illustrated in International Patent publication No. WO 2018/092143, of the same applicant hereof, the disclosure of which is incorporated herein by reference.

The interfacing system comprises in some embodiments one or more object collector units, each collector unit configured to approach an array of grippers on one of the support platforms, remove an array of objects from the grippers, and transfer the objects thereby collected to a respective movable tray for moving the array of objects to the spacer unit for loading onto a batch of accumulated object carriers of the serial conveyor. The collector unit is configured in some embodiments to apply attraction forces on the objects for attaching them thereto. Optionally, and in some embodiments preferably, the collector unit applies the attraction forces at least by vacuum. Alternatively, or additionally, pushing arm(s)/piston(s) can be used remove the array of objects from the grippers onto the respective movable tray.

Optionally, and in some embodiments preferably, each support platform comprises two arrays of grippers mounted thereon to form two parallel aligned rows arranged in opposite object loading directions, one with respect to the other. In some embodiments the two parallel rows of grippers are substantially perpendicular to the direction of movement of the support platform. In this configuration objects can be loaded onto the support platform by placing one movable tray with an array of objects held thereon anterior to the support platform, placing another movable tray with an array of objects held thereon posterior to the support platform, and moving the movable trays one towards the other so as to place each array of objects onto a respective array of grippers of the support platform.

The collector units can be configured to remove the objects from the grippers by placing one collector unit substantially above and aligned with one array of grippers of the support platform, placing another collector unit substantially above and aligned with another array of grippers of the support platform, applying attraction forces by the collector units for attaching the objects held by the grippers to the collector units, and moving the collector units in opposite directions, one with respect to other (i.e., anteriorly and posteriorly), to remove the arrays of objects from the grippers. The collector units are each configured in some embodiments to transfer the array of objects thereby carried to a respective movable tray. In some embodiments the collector unit carrying an array of objects attached thereto is translated into a position substantially above and aligned with a respective movable tray, and then stops application of the attraction forces it applies over the object to thereby let them descent onto the movable tray by gravitation. Optionally, and in some embodiments preferably, the collector unit carrying the array of objects attached thereto is moved downwardly towards the respective movable tray until the objects thereby carried contact the respective movable tray, and thereafter the application of the attraction forces thereby applied is stopped, to thereby release the objects onto the movable tray.

Optionally, and in some embodiments preferably, the interfacing system comprises an object receiver portion and an object dispatcher portion. The object receiver portion comprises at least one accumulator unit configured to receive a batch of objects from a serial feed conveyor system, and if spacing/gaps between objects in the accumulated batch of objects need to be changed, at least one spacer unit configured to change the spacing/gaps between the objects to an object processing spacing/gap dictated by the parallel transporter. The dispatcher portion comprises at least one accumulator unit configured to receive one or more arrays of treated objects from the parallel transporter for removal form the interfacing unit on a serial dispatch conveyor system, and if spacing/gaps between objects in the one or more arrays of treated objects need to be changed, at least one spacer unit configured to change the spacing/gaps between the objects to a spacing/gap dictated by the serial dispatch conveyor system.

Optionally, but in some embodiments preferably, the at least one accumulator unit of the object receiver or dispatcher portions is a stationary unit having one or more moving parts configured to accumulate the carriers of their respective serial conveyor systems. In some embodiments, the at least one accumulator unit is configured to temporarily substantially immobilize at least some portion of the respective serial conveyor system which carriers are thereby accumulated, and maintain the at least some portion of the respective serial conveyor system substantially immobilized at least until objects are removed from, or placed over, the accumulated carriers. Thereafter the substantially immobilization of the at least some portion of the respective serial conveyor system is stopped.

The interfacing system can be configured to receive a serial feed of objects from the serial feed conveyor system, accumulate a batch of the serially fed objects, remove the batch of objects from the serial feed conveyor and transfer it in a form of one or more arrays of objects to an array transporter, concurrently, or sometime thereafter, or before, remove one or more arrays of treated objects from the array transporter, accumulate a batch of object carriers of the serial dispatch conveyor, and load the one or more arrays of treated objects onto the accumulated batch of object carriers as a serial batch of objects.

In possible applications the interfacing system utilizes one or more robotic manipulators/arms configured to remove from the serial feed conveyor system a batch of objects, adjust orientation of the objects according to orientation of the grippers on the support platform, and if needed also adjust the spacing between the objects in the removed batch to assume the object processing gap, and place the removed batch of objects onto the array of grippers of a support platform positioned in a loading zone. The same, or another, one or more robotic manipulators/arms can be similarly used to remove a batch of treated objects from a support platform positioned in an unloading zone, adjust their orientation, and if needed also their spacing, and place them on a group of carriers of a dispatcher conveyor system used to transfer the treated objects to another location/plant, and/or for packaging.

One inventive aspect of the subject matter disclosed herein relates to a system for interfacing between different types of conveyor systems, wherein the conveyor systems comprise a first serial conveyor system (also referred to herein as feed carrier or feed chain) configured to use a sequence of object carriers for transporting a continuous serial stream of objects, and a parallel conveyor system configured to simultaneously transport one or more arrays of objects. The system comprises in some embodiments a first accumulator unit configured to accumulate a batch of object carriers of the first serial conveyor system, where each of the object carriers carrying an object of the continuous serial stream of objects for accumulating a batch of the objects therein, and two or more first movable trays (also referred to herein as receiver movable trays), each configured to receive an array of the objects from the batch of objects accumulated in the first accumulator unit, transfer the received array of objects to the parallel conveyor system, and load the objects thereby carried onto grippers of the parallel conveyor.

A second accumulator unit is used in some embodiments to accumulate a batch of object carriers of a second serial conveyor system (also referred to herein as dispatch carrier or chain). Two or more second movable trays (also referred to herein as dispatcher movable trays) can be used to receive an array of the objects removed from the grippers of the parallel conveyor system in each of the movable trays, and place the received objects on the batch of object carriers accumulated in the second accumulator unit for removal from the system.

A spacing system is used in some embodiments to change the size of gaps between adjacently located objects to be transferred to the parallel conveyor system or to be transferred from the parallel conveyor system. In some embodiments the spacing system comprises a first spacer unit configured to remove the batch of objects from the first accumulator unit, change the size of gaps between adjacently located objects in the batch of objects to a gap size dictated by the parallel conveyor system (the object processing gap), and transfer the batch of objects with the dictated gap size to the two or more first movable trays.

Optionally, and in some embodiments preferably, the first spacer unit is configured to apply attraction forces over the objects for attaching them thereto. The two or more first movable trays can be thus configured to translate to a position substantially underneath the first spacer unit for the spacer unit to stop the attraction forces thereby applied and release the objects onto the two or more first movable trays positioned therebeneath.

In some possible embodiments the system comprises two or more collector units. Each collector unit is configured to remove an array of objects from the grippers of the parallel conveyor system and transfer the removed array of objects to a respective one of the two or more second movable trays. The one or more collector units can be configured to apply attraction forces over the objects for attaching them thereto. The two or more second movable trays can be thus configured to translate to a position substantially underneath the two or more collector units, for the two or more collector units to stop the attraction forces applied over the objects thereby carried and release the carried objects onto the two or more second movable trays.

The parallel conveyor system comprises in some embodiments a plurality of support platforms. Each support platform can comprise two or more arrays of grippers (also referred to herein as object holders), and each of the two or more first movable trays can be configured to load an array of objects onto a respective array of grippers of the support platform. In this way each collector unit can be configured to remove an array of objects from a respective array of grippers of the support platform.

Optionally, and in some embodiments preferably, each support platform comprises two arrays of grippers arranged in two parallel rows, where each row of grippers configured to receive an array of objects from a respective one of the first movable trays. This is carried out in some embodiments by placing one of the first movable trays having an array of objects held thereon anterior to the support platform, placing another one of the first movable trays having an array of objects held thereon posterior to the support platform, and moving the movable trays one towards the other, to thereby place each of the objects carried by the first movable trays onto a respective gripper.

The two or more collector units can be configured to remove the arrays of objects held on the grippers in a similar fashion. This is carried out in some embodiments by placing one of the collector units above one array of grippers of the support platform, placing another one of the collector units above the other array of grippers of the support platform, applying by the collector units attraction forces over the objects held by the grippers to attach them thereto, and moving the collector units in opposite direction one away from the other to remove the objects from the grippers.

The system comprises in some embodiments one or more sensor units configured to generate signals/data indicative of operational states and/or conditions in the system. A control unit can be used in the system to process the signals/data generated by the sensor units and generate corresponding control signals for at least causing the two or more first movable trays to receive the batch of objects accumulated in the first accumulator unit and transfer it to the parallel conveyor system. The control unit can be configured and operable to generate control signals for at least causing the collector units to remove the arrays of objects from the grippers, the second movable trays to receive the objects from the collector units and transfer them to the second accumulator unit. Optionally, and in some embodiments preferably, the control unit is configured to carry out angular registration of the objects placed over the grippers of a support platform.

The control unit is configured and operable in some embodiments to generated control signals for moving each of the collector units to a position above a respective array of grippers of a support platform and for concurrently, or shortly before, placing each of the first moving trays with the array of objects placed thereon in a position adjacent and slightly below a respective array of grippers of the support platform, applying attraction forces by the collector units over objects held by the grippers, moving the collector units in opposite sideway directions one away from the other to remove the objects from the grippers, moving the object collectors and the first moving trays, with the array of objects thereby carried, upwardly to position the object collectors in an object release location, and moving each of the first moving trays in front of a respective array of grippers for placing the arrays of objects thereby carried thereover.

The spacing system comprises in some embodiments a first reciprocating conveyor system and one or more carrier unloaders. Each of the one or more carrier unloaders is used to receive a serial stream of objects form a respective serial supply conveyor system and place the received objects on the first reciprocating conveyor system at one lateral side thereof. The first reciprocating conveyor system is configured to convey the objects longitudinally thereover and move the objects to an opposite lateral side thereof for placing them over object carriers of the first serial conveyor system and to thereby adjust spacing/gaps between the objects carried by the one or more serial supply conveyors to spacing/gaps of the first serial conveyor system.

The spacing system can optionally comprise a second reciprocating conveyor system and a carrier unloader configured to receive a serial stream of treated objects form the second serial conveyor system, and place the received objects on the second reciprocating conveyor system at one lateral side thereof. The second reciprocating conveyor system is configured to convey the objects longitudinally thereover and move the objects to an opposite lateral side thereof for placing them over object carriers of an auxiliary serial conveyor system (also referred to herein as depart serial conveyor or chain), to thereby adjust spacing/gaps between the objects carried by the second serial conveyor system to spacing/gaps of the auxiliary serial conveyor system.

The spacing system comprises in some embodiments a first object reciprocating drum system configured to remove the objects from a serial supply conveyor system, and at least one additional object reciprocating drum system configured to receive the objects from the first object reciprocating drum system and place them on object carriers of the first serial conveyor system, thereby adjusting spacing/gaps between the objects. Optionally, the adjusting of the spacing/gaps between the objects is affected by selection of a length of at least one of the object reciprocating drum systems, or of an angular velocity thereof. A control unit can be used in some applications to adjust the spacing/gaps between the objects by control of angular velocity of at least one of the object reciprocating drum systems.

Another inventive aspect of the subject matter disclosed herein relates to a method for interfacing between different types of conveyor systems. The method comprising accumulating a batch of objects delivered by object carriers of a first serial conveyor system, each of said object carriers carrying an object, removing the accumulated batch of objects form the first serial conveyor system and placing them on two or more first movable trays, each configured to receive an array of the objects, translating the received array of objects to a parallel conveyor system, and loading the two or more arrays of objects onto object loaders of the parallel conveyor system for simultaneous transportation of the two or more arrays of objects by the parallel conveyor. The method comprising in some embodiments accumulating a batch of object carriers of a second (dispatch) serial conveyor system, removing two or more arrays of objects from the object holders of the parallel conveyor system and placing them on two or more second movable trays, moving the two or more second movable trays towards the second serial conveyor system and placing the two or more arrays of objects on the accumulated batch of object carriers.

The method comprising in some embodiments changing size of gaps between adjacently located objects to be transferred to the parallel conveyor system, or to be transferred from the parallel conveyor system, to a gap size dictated by the parallel conveyor system (the object processing gap size). The changing of the size of the gaps can be carried out when removing the batch of objects from the first serial conveyor system. The method comprising in this case transferring the batch of objects to the two or more first movable trays after their gap size was changed to with the dictated object processing gap size.

Optionally, and in some embodiments preferably, the removing of the objects from the first serial conveyor system comprises applying attraction forces over the objects. The objects can be thus moved away from object carriers of the first serial conveyor system while applying the attraction forces. The method can thus comprise positioning the two or more first movable trays substantially underneath the removed objects, and stopping the attraction forces to release the objects onto the two or more first movable trays.

The removing of the two or more arrays of objects from the parallel conveyor system comprises in some embodiments applying attraction forces over the objects, moving the two or more arrays of objects away from object holders of the parallel conveyor system, translating the two or more second movable trays to a position substantially underneath the objects, and stopping the attraction forces applied over the objects to release them onto the two or more second movable trays.

In some embodiments the parallel conveyor comprises a plurality of support platforms, where each support platform comprising two or more arrays of the object holders. The method can comprise moving each of the two or more first movable trays towards a respective array of object holders and loading the array of objects thereby carried onto the respective array of object holders of the support platform.

Optionally, and in some embodiments preferably, each support platform comprises two arrays of the object holders arranged in two parallel rows, where each row of object holders configured to receive an array of objects from a respective one of the first movable trays. The method can comprise placing one of the first movable trays having an array of objects held thereon anterior to the support platform, placing another one of the first movable trays having an array of objects held thereon posterior to the support platform, and moving the movable trays one towards the other, to thereby place each of the objects carried by the first movable trays onto a respective object holder. The removing of the arrays of objects from the object holders comprises in some embodiments applying the attraction forces over each of the arrays of objects and moving the array of objects in directions opposite one to the other to remove the objects from the object holders.

In some embodiments the removing of the arrays of objects from the objects holders of the support platform is carried out in parallel with the loading of new objects over the object holders. The method can thus comprise moving each of the collector units to a position above a respective array of object holders of a support platform and concurrently, or shortly before, placing each of the first moving trays with array of new objects placed thereon in a position adjacent and slightly below a respective array of object holders of the support platform, applying attraction forces by the collector units over objects held by the object holders, moving the collector units in opposite sideway directions one away from the other to remove the objects from the object holders, moving the object collectors and the first moving trays, with the array of objects thereby carried, upwardly to position the object collectors in an object release location, and to position each of the first moving trays in front of a respective array of object holders for placing the arrays of objects thereby carried thereover.

The method comprises in some embodiments immobilizing the objects placed over one row of the object holders while rotating the objects placed over another row of the object holders, and stopping the rotation of each one of the objects when it is angularly aligned with a respective one of the immobilized objects.

In some embodiment the objects are received from one or more serial feed conveyor systems. The method can comprise removing the objects from the one more serial feed conveyor systems and placing them on a first reciprocating conveyor system at one lateral side thereof, conveying the objects longitudinally over the first reciprocating conveyor system and moving them to an opposite lateral side thereof for placing them over object carriers of the first serial conveyor system and thereby adjusting spacing/gaps between the objects carried by the one or more serial feed conveyors to spacing/gaps of the first serial conveyor system. The method can comprise at least one of controlling conveying velocity of the first reciprocating conveyor and adjusting a side-to-side movement length of the objects thereover, for adjusting the spacing/gaps between the objects placed over the object carriers of the first serial conveyor system.

The objects are moved in some embodiments from the second serial conveyor system to an auxiliary serial conveyor system having a different spacing/gaps between its object carriers. The method can comprise removing objects received from the second serial conveyor and placing them on a second reciprocating conveyor system at one lateral side thereof, conveying the objects longitudinally over the reciprocating conveyor system and moving them to an opposite lateral side thereof for placing them over the object carriers of the auxiliary serial conveyor system, thereby adjusting spacing/gaps between the objects carried by the second serial conveyor system to spacing/gaps of the auxiliary serial conveyor system. The method comprises in some embodiments at least one of controlling conveying velocity of the second reciprocating conveyor system and adjusting a side-to-side movement length of the objects thereover, for adjusting the spacing/gaps between the objects placed over the object carriers of the auxiliary serial conveyor system.

The can comprise providing a first object reciprocating drum system and at least one additional object reciprocating drum system, removing the objects from a serial supply conveyor system by the first object reciprocating drum system, transferring the objects from the first object reciprocating drum system to the second object reciprocating drum system, and placing the objects transferred to the second object reciprocating drum system on object carriers of the first serial conveyor system, thereby adjusting spacing/gaps between the objects. Optionally, adjusting the spacing/gaps between the objects is carried out by control of angular velocity of at least one of the object reciprocating drum systems.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIG. 3A shows a top view of the spacer unit and FIG. 3B schematically illustrates the spacer unit while exchanging two arrays of objects with two respective movable trays;

FIGS. 4A and 4B schematically illustrate movable trays configured according to some embodiments to move two or more arrays of objects between different conveyor systems, wherein FIG. 4A shows the movable trays in a state before collecting arrays of objects from an accumulator unit, and FIG. 4B shows the movable trays in a states before placing the arrays of objects over the grippers of a support platform located in a load/unload zone of a parallel conveyor;

FIGS. 5A to 5H schematically illustrate operation of the array collector units according to some possible embodiments, where FIG. 5A illustrates the array collector unit in object array collection position as it is approaching a support platform for collecting objects carried thereon, FIG. 5B illustrates the array collector unit in object array release position as it is transferring the collected object to a dispatcher movable tray of the object server system, and FIGS. 5C to 5H illustrate a possible process of unloading two or more arrays of treated objects from a support platform and thereafter loading two or more arrays of objects onto the support platform;

FIGS. 8A and 8B schematically illustrate a carrier load/unload unit according to some possible embodiments, wherein FIG. 8A is a longitudinal sectional view and FIG. 8B is a side sectional view of the carrier load/unload unit;

FIGS. 9A to 9C schematically illustrate an object transport system utilizing space adjustment system(s) to intermediate between serial conveyor system(s) and an interfacing system used therein according to some possible embodiments, wherein FIG. 9A illustrates the object transporter system, FIG. 9B illustrates a space adjustment system usable for intermediating between a plurality of serial feed conveyor systems and the interfacing system, and FIG. 9C illustrates a space adjustment system usable for intermediating between the interfacing system and a serial dispatch conveyor systems;

FIGS. 10A and 10B schematically illustrate an object transport system according to some possible embodiments, wherein FIG. 10A shows a transport system capable of selectively receiving a manual feed of objects or a serial stream of objects supplied by a serial conveyor system, and FIG. 10B demonstrate coupling of two carrier loader systems for adjusting the gaps between the objects; and FIGS. 11A and 11B schematically illustrate serial feed conveyor systems according to some possible embodiments, wherein FIG. 11A demonstrates applying a single twist in a carrier medium of the conveyor system, and FIG. 11B demonstrates applying a number of twists to the carrier medium of the conveyor system.

DETAILED DESCRIPTION OF EMBODIMENTS

Figure 1:
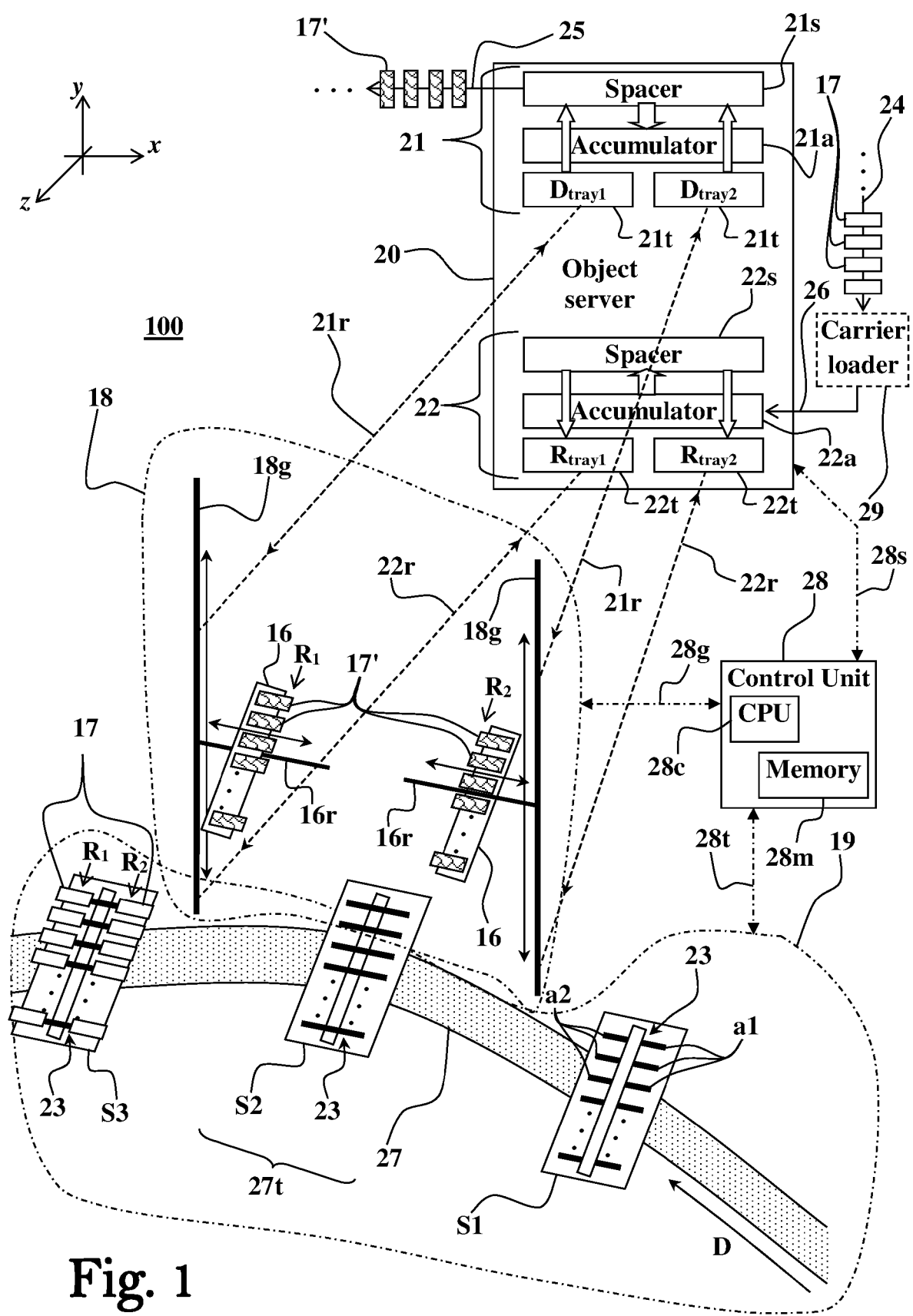
FIG. 1 schematically illustrates an interfacing system configured for transferring objects between different types of conveyor systems according to some possible embodiments.

One or more specific embodiments of the present application will be described below with reference to the drawings, which are to be considered in all aspects as illustrative only and not restrictive in any manner. In an effort to provide a concise description of these embodiments, not all features of an actual implementation are described in the specification. Elements illustrated in the drawings are not necessarily to scale, or in correct proportional relationships, which are not critical for understanding the invention. Emphasis instead being placed upon clearly illustrating the principles of the invention such that persons skilled in the art will be able to make and use it, once they understand the principles of the disclosed subject matter. This invention may be provided in other specific forms and embodiments without departing from the essential characteristics described herein.

The present application proposes techniques, equipment and related machinery, for interfacing between conveyor systems designed to allow continuous processing of objects transported in a production line, without causing any interruptions/delays in the production process. Embodiments disclosed herein are particularly useful for transferring/converting an object stream supplied by a continuous object conveyor system (e.g., serial chain carrier conveyor, generally referred to herein as serial object carrier) of a production line to an array conveyor (i.e., designed to concurrently transport two or more parallel streams of objects), and/or for transferring/converting objects from the array conveyor back into an object stream transported by a continuous object conveyor of a production line.

In some embodiments the interfacing systems disclosed herein are used to concurrently load a plurality of objects supplied by a continuous serial object carrier e.g., of a production line, onto an array transporter configured to concurrently transfer two or more streams of the loaded objects through one or more object treatment processes applied in parallel to batches of objects in the two or more streams of the objects as they are moved along a lane, and to concurrently unload the two or more streams of the objects from the array transporter onto a continuous serial object carrier e.g., of the same, or different, production line. Accordingly, embodiments of the interfacing systems disclosed herein are configured to transform a serial stream of objects into two or more parallel streams of objects for application of one or more surface treatments (e.g., printing, surface energy/tension treatments, curing, cleanup, and suchlike), and thereafter transform the treated objects in the two or more parallel streams of objects back into a serial stream of objects.

In some embodiments the array transporter comprises one or more support platforms, each support platform configured to receive two or more parallel streams of the objects and concurrently pass them through the treatment processes applied along the lane. Optionally, and in some embodiments preferably, the lane on which the two or more parallel streams of objects are moved for the application of the one or more treatment processes, is a closed-loop lane.

For an overview of several example features, process stages, and principles of the invention, the examples of interfacing systems illustrated schematically and diagrammatically in the figures are intended for a printing system. These interfacing systems are shown as one example implementation that demonstrates a number of features, processes, and principles used to provide a very high throughput printing system, but they are also useful for other applications and can be made in different variations. Therefore, this description will proceed with reference to the shown examples, but with the understanding that the invention recited in the claims below can also be implemented in myriad other ways, once the principles are understood from the descriptions, explanations, and drawings herein. All such variations, as well as any other modifications apparent to one of ordinary skill in the art and useful in object transport applications may be suitably employed, and are intended to fall within the scope of this disclosure.

FIG. 1 schematically illustrates an interfacing system 100 configured according to some possible embodiments to transfer streams of objects from one conveyor system to another. System 100 is configured to receive a continuous stream of objects 17 supplied by the serial object carrier 24, transfer an accumulated batch of the supplied objects 17 to an object arrays/parallel transporter 19 configured to move the batch of objects along a lane 27 in a form of two or more parallel streams/arrays of objects 17. The interfacing system 100 is also configured in some embodiments to receive two or more parallel streams/arrays of objects 17' supplied by the array transporter 19 over the lane 27 and concurrently convert the two or more parallel object streams/arrays into a continuous serial stream of objects removed from the system 100 by the closed loop object dispatch carrier 25 (also referred to herein as dispatch carrier e.g., a chain conveyor system) passing in the object server system 20.

The interfacing system 100 comprises the object server system 20 configured to receive continuous serial stream(s) of objects 17 in an object receiver portion 22 thereof. The object server system 20 is configured to receive the continuous serial object stream(s) and serve them to a portal system 18. The portal system 18 is configured to remove accumulated batches of objects 17 from the object receiver portion 22 of the server system 20, convert each batch of objects removed from the object receiver portion 22 into two or more arrays of objects 17, and load the two or more arrays of objects 17 onto respective two or more arrays of object gripper 23 of the array transporter 19 at an object load/unload zone 27t of the lane 27.

The array transporter 19 comprises one or more support platforms, S1, S2, S3 . . . (also referred to herein as $S_q$, where q≥1 is a positive integer), each comprising two or more arrays of object grippers 23 configured to receive and hold respective two or more parallel streams/arrays of objects 17 received from the portal system 18 at the object load/unload zone 27t of the lane 27. In a similar fashion, the portal system 18 is configured in some embodiments to remove two or more parallel streams/arrays of objects 17 from one of the support platforms, $S_q$ at the object load/unload zone 27t of the lane 27, and transfer the removed two or more parallel streams of objects 17' to the object dispatcher portion 21 of the object server system 20.

It is noted that in some embodiments the array transporter 19 is configured to move the two or more parallel streams of objects 17 through one or more surface treatment processes/stations (not shown) applied along the lane 27. The objects removed from the array 19 by the portal system 18 after undergoing the one or more treatment processes are thus referenced by reference numeral 17', used to designate surface treated objects, in order to distinguish them from the untreated stream of objects 17 supplied to the system 100 by the serial object carrier 24. In some embodiments the array transporter 19 is configured as, or as a part of, a printing system, such as described in international patent publication No. WO 2014/076704 of the same applicant hereof.

In some embodiments a carrier loader system (also referred to herein as object reciprocating drum system) 29 is used to transfer the objects 17 received via the serial object carrier 24 to a closed loop object feed carrier 26 (also referred to herein as feed carrier for short e.g., chain conveyor) passing in the object server system 20. Optionally, and in some embodiments preferably, the serial object carrier 24 is a type of belt or tilt roller conveyor, and the carrier loader system 29 is configured and operable to transfer the objects 17 from the belt or tilt roller conveyor to the closed loop object feed carrier 26. In this case, the objects can be manually loaded onto the serial object carrier 24.

The objects 17 received from the serial feed carrier 26 are introduced into the accumulator unit 22a of the object receiver portion 22, configured to accumulate a batch of the objects 17 while being held and supplied by the serial feed carrier 26, without interrupting the continuous transfer of the objects 17 thereby supplied. The accumulated batch of objects 17 is then removed from accumulator unit 22a, and from the serial feed carrier 26 that introduced it into the accumulator 22a, by the spacer unit 22s. The spacer unit 22s is configured to grip the objects 17 accumulated in the accumulator unit 22a in a serial conveyor-gap-state, remove the gripped objects 17 from the serial feed carrier 26, and thereafter change into an object processing-gap-state for adjusting the gap/pace between the objects 17 in the griped batch of objects into a gap/pace between adjacently located object grippers 23 of the support platforms S1, S2, S3 . . . , movably mounted on the lane 27 of the object arrays/parallel transporter 19.

After adjusting gaps spacing/pace between the objects 17 in the batch of objects removed from the accumulator unit 22a, the spacer unit 22s load the objects 17 of the batch onto two or more receiver movable trays 22t. The receiver movable trays 22t are configured to transfer the batch of objects 17 from the server system 20 to the portal system 18 as two or more arrays of objects 17, and adjust orientation of each array of objects 17 for loading it onto a respective array of objet grippers 23 of one of the support platforms $S_q$. Optionally, and in some embodiments preferably, each receiver movable tray 22t is configured to receive a same number of objects 17, defining a respective one array of object arrays loaded by the portal system 18 onto one of the support platforms $S_q$, of the array transporter 19.

In some possible embodiments the spacing/gaps between the objects supplied to the receiver portion 22 is a priori matching the object processing spacing/gaps between the object grippers 23 of the support platforms $S_q$. In such possible embodiments the spacer unit 22s is not required and thus can be remove/omitted from the receiver portion 22, and the receiver movable trays 22t are configured to fetch the batch of objects 17 directly from the accumulator unit 22a.

The receiver movable trays 22t, with the object arrays $R_i$ loaded thereon (where i≥2 is a positive integer), are moved over load-rails 22r to the portal system 18, wherein each receiver movable tray 22t places its respective object array $R_i$ onto a respective array of object grippers 23 of one of the support platforms $S_q$.

In this specific and non-limiting example the server system 20 comprises two receiver movable trays 22t, $R_{tray1}$ and $R_{tray2}$, and accordingly if the batch of objects comprises 2n objects 17, then each receiver movable tray 22t is configured to receive n objects defining one array of object of the object arrays $R_1$ and $R_2$ (where n is a positive integer). Correspondingly, in this specific and non-limiting example each support platform $S_q$ comprises two arrays of n object grippers 23, each configured to receive one array $R_i$ of n objects 17.

The receiver movable trays 22t are configured in some embodiments to rotate with the respective object arrays $R_i$ loaded thereon in a horizontal plane (parallel to, or in the, 'x-z' plane) to adjust orientations of the objects to orientations of respective array of grippers 23 of the support platforms $S_q$. Optionally, and in some embodiments preferably, the orientations of the object arrays $R_i$ are concurrently adjusted by the receiver movable trays 22t while they are being moved over the receiver movable trays 22t towards the portal system 18. In this specific and non-limiting example the objects 17 are received in the accumulator 22a along a carrier portion that is substantially parallel to, or coinciding with, the 'x' axis, and after they are collected by the receiver movable trays 22t, each tray undergo a 90° rotation in the 'x-z' plane to adjust the orientation of the object array $R_i$ thereby carried.

Optionally, and in some embodiments preferably, the objects 17 are elongated hollow items (e.g., tubes, cans, bottles, or suchlike), each having at least one opening at one extremity thereof, and each gripper comprises a mandrel assembly configured to be received inside one of the objects 17, via its at least one opening, and grip the object 17 by at least partially contacting internal surface areas thereof. The receiver movable trays 22t can be thus configured to adjust the orientations of the collected object arrays $R_i$ such that the at least one opening of each object is brought to face a respective mandrel assembly of the array of grippers 23 of a support platforms $S_q$ located in the object load/unload zone 27t. In this specific and non-limiting example the receiver movable tray $R_{tray1}$ is configured to carry out a 90° rotation about the y-axis, and the receiver movable tray $R_{tray2}$ is configured to carry out a −90° rotation about the 'y'-axis, such that the elongated axes of the $R_{tray1}$ and $R_{tray2}$ trays become substantially parallel to the 'z'-axis.

After collecting the object arrays $R_i$ and rotating the receiver movable trays 22t, the receiver movable trays 22t are moved to the object load/unload zone 27t in the portal system 18, and positioned therein such that each object 17 on one of the receiver movable trays 22t is facing a respective gripper (mandrel) of the object gripper arrays 23 of the support platform $S_q$ located in the object load/unload zone 27t (S2 in FIG. 1). The receiver movable trays 22t are then moved horizontally a relatively short distance one towards the other for placing/sliding each object 17 over a respective gripper/mandrel of the support platform $S_q$. The grippers 23 can be then activated to apply a griping force over the objects 17 of the object array $R_i$, and the receiver movable trays 22t can be then horizontally retracted is opposite sideways directions leaving the collected objects 17 gripped on the support platform $S_q$ located in the object load/unload zone 27t.

In this specific and non-limiting example each support platform $S_q$ comprises two parallel rows of grippes 23 arranged such that each pair of adjacently located grippers belonging to different rows of grippers are substantially aligned along a common axis of rotation of the pair of grippers. The common axis of rotation of the pair of adjacently located grippers belonging to two different rows of grippers being substantially parallel to, and in the same plane of, the common axes of rotation of the other pairs of adjacently located grippers belonging to the two different rows of grippers 23. Thus each pair of objects 17 placed over such pair of adjacently located grippers belonging to two different rows of grippers 23 are also aligned along the same axis of rotation, but in opposite directions, such that their openings are facing each other.

In this non-limiting example, the axes of rotations of the grippers 23 on the support platform S2 located in the load/unload zone 27t are located substantially in the 'x-z' plane, such that each axis of rotation is substantially parallel to the 'x'-axis. Thus, the receiver movable tray $R_{tray1}$ is moved in the load/unload zone 27t in the '+x' direction, and the receiver movable tray $R_{tray2}$ is moved in the load/unload zone 27t in the '−x' direction, for placing/sliding the objects 17 thereby carried over their respective grippers 23. After the object array $R_i$ carried by the receiver movable trays 22t is transferred to the support platform S2, the receiver movable tray $R_{tray1}$ is moved in the '−x' direction, and the receiver movable tray $R_{tray2}$ is moved in the '+x' direction, to disengage the support platform S2, and the receiver movable trays 22t are then moved back over the load-rails 22r towards the object server system 20, and rotated back for substantial alignment with the 'x'-axis.

In some embodiments the object server system 20 is configured to remove continuous streams of objects 17' in an object dispatcher portion 21 thereof. For this purpose the object server system 20 is configured in some embodiments to concurrently receive in accumulator unit 21a of its object dispatcher portion 21 two or more arrays of objects 17' from the portal system 18 by the dispatcher movable trays 21t, and concurrently load the received two or more arrays of objects 17' onto the closed loop object removal/dispatch carrier/conveyor 25, which can be configured to deliver the objects 17' into a production process line. The object dispatcher portion 21 comprises a spacer unit 21s configured to concurrently remove the arrays $R_i$ of objects 17' delivered thereto by the dispatcher movable trays 21t, and place them on a respective batch of carrier units of the object removal/dispatch carrier/conveyor 25 accumulated in the accumulator unit 21a of the object dispatcher portion 21.

In some possible embodiments the spacing/gaps between the carrier units of the object removal/dispatch carrier 25 are a priori matching the object processing spacing/gaps between the object grippers 23 of the support platforms $S_q$. In such possible embodiments the spacer unit 21s is not required and thus can be removed/omitted from the dispatcher portion 21 of the object server 20, and the dispatcher movable trays 22t are configured to place the arrays $R_i$ of objects 17' directly over the carrier units of the object removal/dispatch carrier/conveyor 25.

Figure 2:
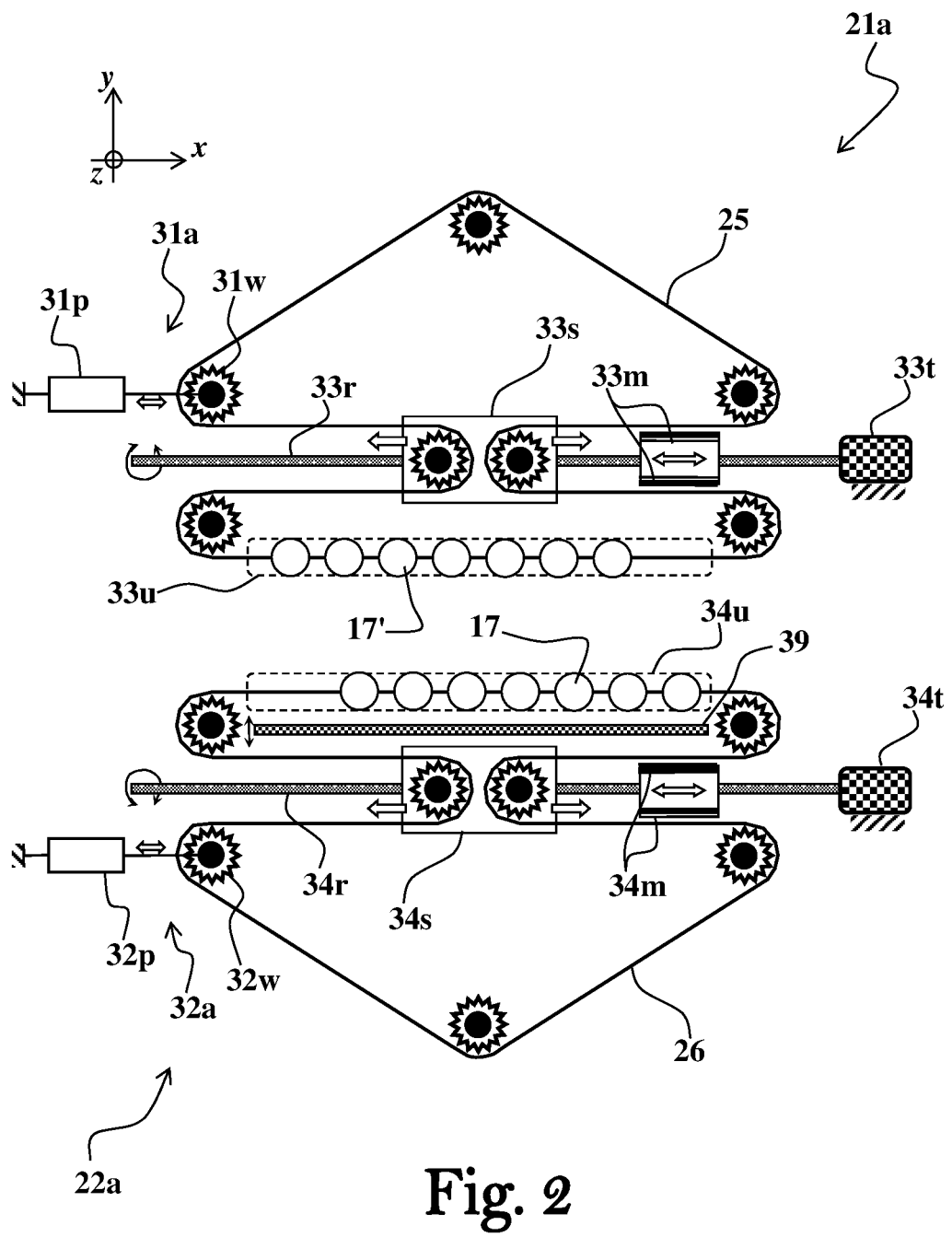
FIG. 2 schematically illustrates objects accumulator units according to some possible embodiments.

FIG. 2 schematically illustrates possible embodiments of the accumulator units 21a and 22a. For the sake of simplicity only elements required for understanding of operational principles of the accumulator units are shown, as other implementation specific elements and features can be easily derived by persons versed in the field of the invention once they understand these principles. In this specific and non-limiting example each of the accumulator units 21a and 22a is located along a section of a closed loop carrier/conveyor 25 and 26, respectively. The accumulator 21a is implemented by a movable sprocket assembly 33s mounted for sliding movement over a rod 33r, and accumulator 22a is implemented by a movable sprocket assembly 34s mounted for sliding movement over a rod 34r. Each sprocket assembly 33s and 34s is configured to slide horizontally (along 'x' axis directions) over the respective rod 33r and 34r (e.g., using a leadscrew mechanism), and comprises two sprocket wheels mounted for rotation on a slidable platform, where the sprocket wheels of each assembly are configured to be mechanically engaged with a respective closed loop chain of the closed loop object carrier/conveyor, 25 and 26.

In the accumulating-states of the accumulator units 21a and 22a, the sprocket assemblies 33s and 34s are configured to controllably cause temporal stop of movement of a portion of the engaged chain by horizontally sliding the sprocket assemblies 33s and 34s in a first (i.e., 'x'-axis) direction, that elongates the stopped chain portion at one side thereof and shortens the chain at the other side thereof, thereby temporarily and locally stopping movement of the chain portion without interrupting the continuous movement of the other portion of the chain.

In its accumulating-state the accumulator unit 22a of the object receiver portion (22) is configured to serially receive a stream of objects 17 and periodically or intermittently remove the received objects as a batch of two or more arrays of objects by locally stopping movement of a portion of the object feed chain 26 within determined time intervals at the object receipt zone 34u, wherefrom the accumulated batch of received objects 17 are removed by the respective spacer unit (22s). The local stoppage of the portion of the feed chain 26 carrying the batch of objects 17 is carried out by sliding the sprocket assembly 34s in the first direction. After the objects 17 of the batch are removed by the spacer unit (22s) from the object receipt zone 34u, the accumulator unit 22a is changed into its discharge-state by sliding the sprocket assembly 34s in a second (opposite) direction along the rod 34r.

In some embodiments a moving plate 39 located spaced apart below the batch of objects 17 is used to disengage the objects 17 accumulated in the object receipt zone 34u from the object feed chain 26 (from the elongated carriers 44 shown in FIG. 4A). After a batch of objects 17 is accumulated in the object receipt zone 34u, the moving plate 39 is moved upwardly to engage the accumulated batch of objects 17 from underneath and slightly lift them upwardly towards the spacer unit (22s), which then grabs the accumulated batch of objects 17 and removes them from the object receipt zone 34u. Optionally, and in some embodiments preferably, the moving plate 39 is configured to cause the accumulated batch of objects 17 to abut against the spacer unit (22s). After the batch of objects is grabbed by the spacer unit the moving plate 39 is move downwardly back to its disengaged position.

In its accumulating-state the accumulator unit 21a of the object dispatch portion 21 is configured to periodically or intermittently receive treated objects 17' provided as a batch of two or more arrays of treated objects 17', and serially remove the received batch of treated objects, by locally stopping movement of a portion of the dispatching chain 25 within determined time intervals at the object transfer zone 33u, wherein a batch of one or more arrays ($R_i$) of treated objects 17' are placed by the respective spacer unit (21s) over the accumulated object carriers of the dispatching chain 25. The local stoppage of the portion of the dispatching chain 25 that receives the batch of treated objects 17' is carried out by sliding the sprocket assembly 33s in the first direction. After the batch of treated objects 17' is placed by the spacer unit (21s) on the portion of the dispatching chain 25 locally stopped in object transfer zone 33u, the accumulator unit 21a is changed into its discharge-state by sliding the sprocket assembly 33s in a second (opposite) direction along the rod 33r.

In this specific embodiment the rods 33r and 34r are threaded rods rotated by respective motors, 33t and 34t, and the respective movable sprocket assembles 33s and 34s are attached to their respective rods by respective slide elements, each having a nut portion for causing a screw-driven motion (in the 'x' axis directions) responsive to rotations of the rod, thereby forming a leadscrew mechanism. The sprocket assembles can be movably engaged with top and bottom slider guides (not shown) for linear movement thereof over respective pairs of top and bottom guiding rails (not shown).

The accumulator units 21a and 22a can comprise top and/or bottom chain guiding elements (not shown) configured to maintain their chains aligned in place and prevent vertical displacements thereof. Each accumulator unit optionally comprises movable upper and bottom chain guiding elements configured to prevent chain vertical displacements and maintain alignment during the movement of the sprocket assembly. For example, an upper and bottom chain guiding element 33m is used in the accumulator unit 21a to move in alignment with, and in the same direction of movement of the respective sprocket assembly 33s, and an upper and bottom chain guiding element 34m is used in the accumulator unit 22a to move in alignment with, and in the same direction of movement of the respective sprocket assembly 34s.

In some embodiments each accumulator unit comprises a chain tensioning unit configured to maintain a certain desired tension level in the supply and dispatch chains, 26 and 25, respectively. In the accumulator unit 21a the tension of the dispatching chain is maintained by the chain tension unit 31a having a movable sprocket wheel 31w configured to move and adjust the tension of the chain 25, and in the accumulator unit 22a the tension of the feed chain 26 is maintained by the chain tension unit 32a having a movable sprocket wheel 32w configured to move and adjust the tension of the chain 26. The sprocket wheels 31w and 32w of the chain tension units 31a and 32a are mounted for rotation on respective slider elements configured for sliding movements e.g., over respective pairs of top and bottom guiding rails (not shown). The slider elements of the chain tension units 31a and 32a are mechanically coupled to linear actuators 31p and 32p (e.g., pneumatic actuators), respectively, configured to affect a desired constant tension level in the chains engaged with their respective sprocket wheels e.g., by maintaining a certain constant level of pressure in the pneumatic actuator.

Figure 3A:
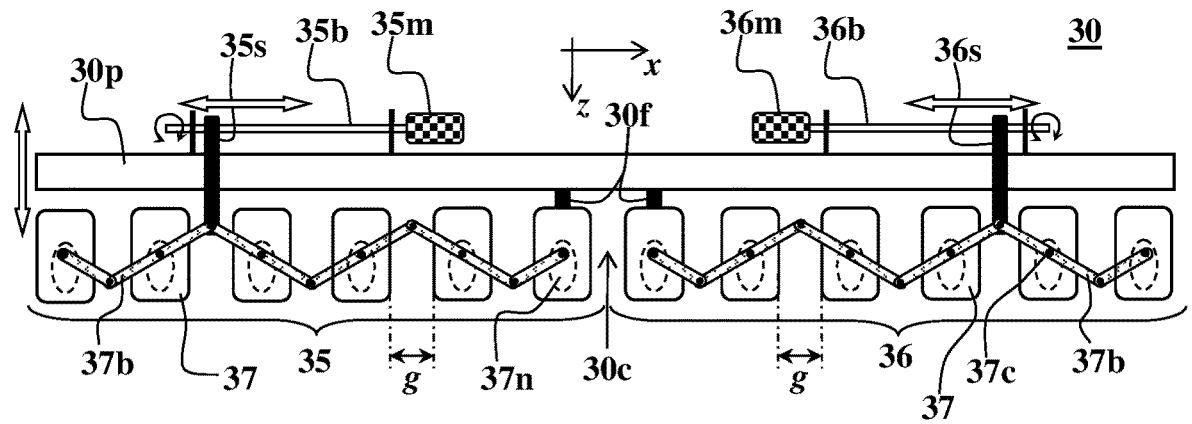
FIGS. 3A and 3B schematically illustrate a spacer unit according to some possible embodiments, where

FIG. 3A shows a top view of a spacer unit 30 according to some possible embodiments. The spacer unit 21s of the object dispatcher portion 21 of the object server system 20, and/or the spacer unit 22s of the object receiver portion 22 of the object server system 20, can be implemented by the spacer unit 30. The spacer unit 30 comprises a horizontal support bar 30p and two or more arrays of movable and horizontally aligned object holders 37. The object holders 37 can each be constructed from a rectangular flat element oriented in accordance with the orientation of the object (17)

to be thereby held. In this specific and non-limiting example the orientation of the object holders 37 is such that their long axes are substantially perpendicular to the axis of the support bar 30*p* (i.e., aligned with the 'z' axis), and the object holders 37 of each array are interconnected one to the other by a linear motion linkage mechanism configured to affect sideway expansion and retraction movement of the arrays of object holders 37 along an axis substantially parallel to the axis of the support bar 30*p* (i.e., parallel to the 'x' axis).

The expansion/retraction motion of each array of object holders 37 is performed by a respective linear motion actuator, such as screw-driven motion actuator, configured to cause linear motion of the object holders 37 along their axis of motion (i.e., in '+x' or '-x' directions). Each array of object holders 37 cab be in a form of a row of aligned holders arranged such that an object holder 37 at one end extremity of the array is fixedly connected to the support bar 30*p*, and one or more of the other object holders 37 near, or at, the other end extremity of the array are mechanically linked to the respective linear actuator.

In this specific and non-limiting example the spacer unit 30 comprises two arrays, 35 and 36, of object holders 37 successively aligned along the axis of motion of the object holders 37 with respect to the support bar 30*p* (i.e., along the 'x'-axis). Two adjacently located object holders 37 of the two arrays located near the center 30*c* of the unit are fixedly connected to the support bar 30*p* at 30*f*, and each intermediate object holder 37 is mechanically linked to two locally adjacent object holders 37 by a respective rotatable link bar 37*b*. The rotatable link bar 37*b* of each intermediate object holder 37 is pivoted at its center 37*c* to the respective object holder 37, and pivoted at each extremity thereof to a rotatable bar 37*b* of a locally adjacent object holder 37, such that a zigzagged expansion/retraction mechanical linkage is obtained. The mechanical linkage between object holders 37 thus causes all object holders 37 in the array, except for the object holder fixedly attached to the support bar 30*p*, to concurrently move substantially at the same velocity and direction in response to the motion of the one or more object holders coupled to the linear actuator. In this way each array of object holders 37 can be sideway expanded or contracted while maintaining substantially same/equal gaps/paces g between the locally adjacent object holders 37 of the array.

Each of the arrays of object holders 35 and 36 is mechanically coupled by a respective slider 35*s* and 36*s* to a respective actuator, 35*m* and 36*m*. The sliders 35*s* and 36*s* are configured in some embodiments to slide over a respective rotatable threaded rod, 35*b* and 36*b*, using a nut element i.e., leadscrew mechanism. The sliders 35*s* and 36*s* are shown in FIG. 3A pivotally attached to respective pivot points of two rotatable link bars 37*b* for moving the object holders 37 along the axis of motion of the object holders 37. Optionally, and in some embodiments preferably, the sliders 35*s* and 36*s* are attached directly and fixedly to one of the object holders 37 of their respective array, for moving the object holders 37 along their axis of motion.

The actuators, 35*m* and 36*m*, can be implemented by electrical engines configured to rotate their respective threaded rods, 35*b* and 36*b*, in a certain direction and speed of rotations to affect either expanding or retracting motion of the object holders 37 in the respective array, 35 and 36. Each object holder 37 comprises at least one object collect unit 37*n* provided at a bottom side thereof, and configured to apply attraction forces over a respective one of the objects in the array, and thereby cause attachment of the object (17) thereto, when placed above and adjacent the object. In this specific and non-limiting example each array of object holders 35 and 36 comprises six object holders 37, such that the spacer unit 30 is capable of concurrently receiving a batch of twelfth objects arranged to form two object arrays.

The object collect units 37*n* can be configured to apply the attraction forces using suction/vacuum applicators, electromagnets, electric fields applicators, electrostatic forces applicators, or any combination thereof. Optionally, and in some embodiments preferably, each object collect unit 37*n* comprises at least one suction aperture pneumatically coupled to a vacuum source (not shown) configured to controllably apply and stop the attraction forces applied on the objects.

In the object receiver portion 22 of the object server system 20, the spacer unit 22*s*/30 is placed in the serial conveyor-gap-state above a batch of objects serially introduced into the accumulator unit 22*a* to place each object holder 37 in proximity of a respective object 17, the object collect units 37*n* are activated to lift the objects in the accumulator unit 22*a* upwardly and attach each object 17 in the batch to its respective object holder 37. If the object receiver portion 22 comprises the optional moving plate 39 (shown in FIG. 2), the object collect units 37*n* can be activated after the moving plate 39 is lifted upwardly to disengage the objects 17 from the dispatching chain 25. The spacer unit 22*s*/30 is then forwardly moved (in the 'z' axis direction) to remove the objects 17 attached by vacuum to the object holders 37 from their respective carriers (not shown) and eject them from the accumulator unit 22*a*. Concurrently, or shortly thereafter, the actuators 35*m* and 36*m* are activated to rotate in certain directions and speed to affect linear expansion, or contraction, of the respective object holder arrays, and 36, to thereby change the spacer into the object processing-gap-state to adjust the gaps g between each pair of adjacently located object holders 37 of the same array.

Optionally, and in some embodiments preferably, the spacer unit 22*s*/30 is placed above the objects 17 in the accumulator unit 22*a* in the serial conveyor-gap-state in an expanded state, and after removing the objects 17 attached by vacuum thereto from the accumulator 22*a*, the actuators 35*m* and 36*m* are activated to cause retraction of the object holder arrays 35 and 36, so as to change the spacer into the object processing-gap-state by reducing the gaps/paces g between adjacently located objects in each array and to adjust them to the object processing gaps/paces between adjacently located grippers in the grippers array 23 of the support platforms $S_q$. The spacer unit 22*s*/30 is shown in FIG. 3A in an expanded object processing-gap-state i.e., with enlarged spacing/pacing g between adjacently located object holders 37.

Figure 3B:
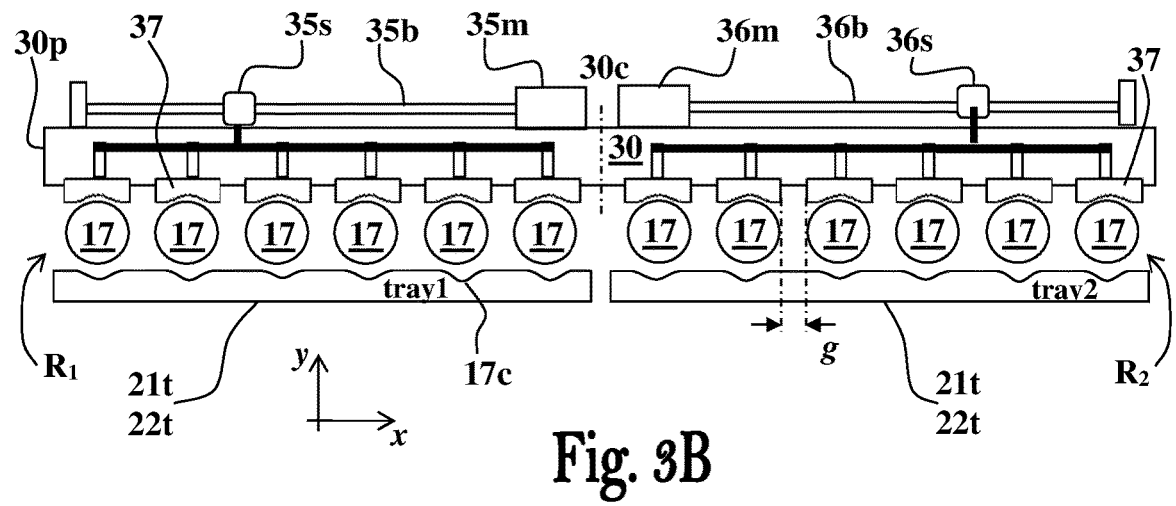

FIG. 3B shows a front view of the spacer unit 30 while exchanging two arrays of objects, $R_1$ and $R_2$, with two respective movable trays, 21*t*/22*t*. For this specific and non-limiting example the movable trays may be the dispatcher movable trays 21*t* of the object dispatcher portion 21 of the object server system 20, or alternatively the receiver movable trays 22*t* of the object receiver portion 22 of the object server system 20. As seen, the bottom side of the object holders 37 can be curved/concaved to form an elongated channel configured to receive object 17, which is in some possible embodiment an elongated cylindrical object.

In the object receiver portion 22 of the object server system 20, after setting the gaps/paces g between adjacently located objects 17 in each array of objects $R_i$ to comply with the gaps of the grippers 23 of the support platforms $S_q$, a respective movable tray 22*t* is placed under each array of objects $R_1$ and $R_2$, and the application of the attraction forces by the object collect units 37n is stopped to release the objects 17 held by the object holders 37. Consequently, the held objects 17 are dropped by gravity forces downwardly and received in respective object receive element 17c provided in the respective movable trays 22t. Optionally, and in some embodiments preferably, the movable trays 22t are placed underneath the spacer unit 30 such that the objects carried by the spacer unit 30 contact the movable trays 22t, and thereafter the application of the attraction forces is stopped to release the objects onto the movable trays 22t.

Figure 4A:
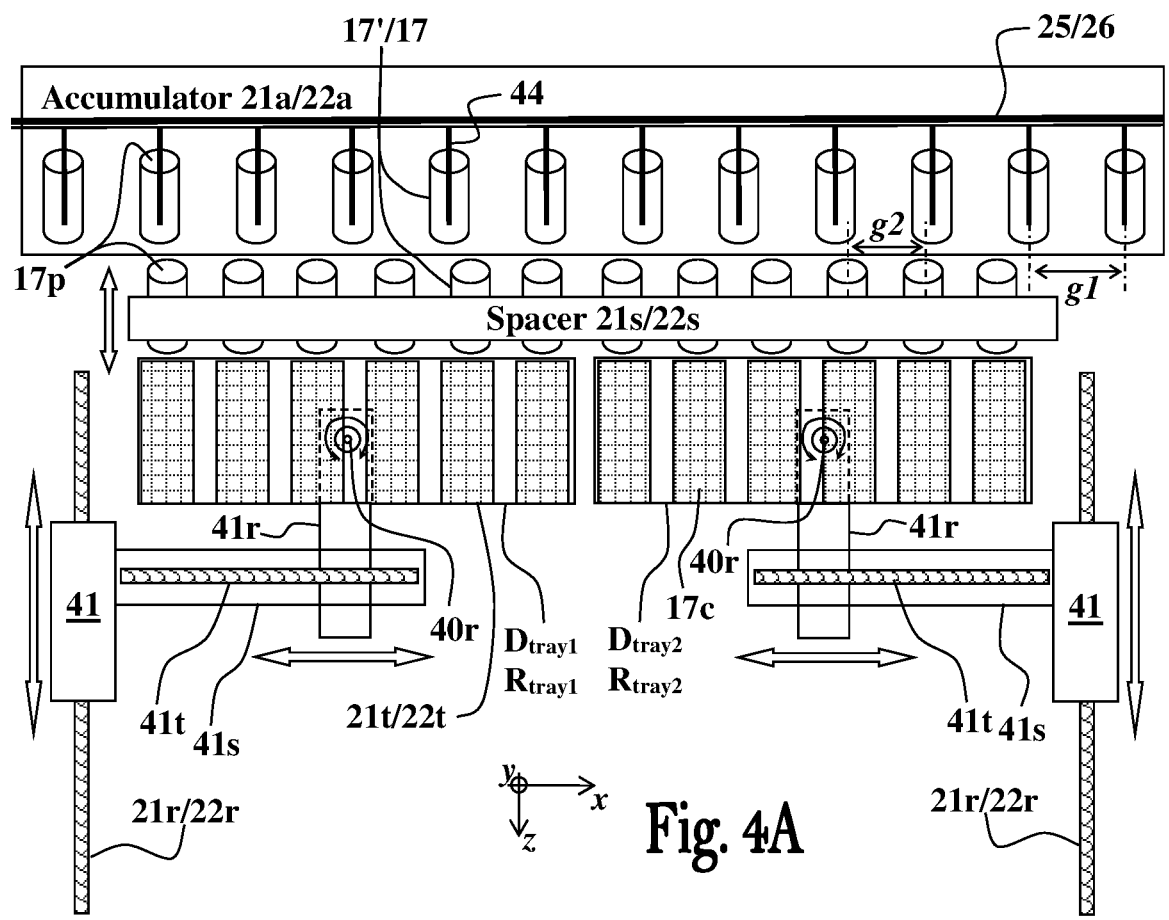
Figure 4B:
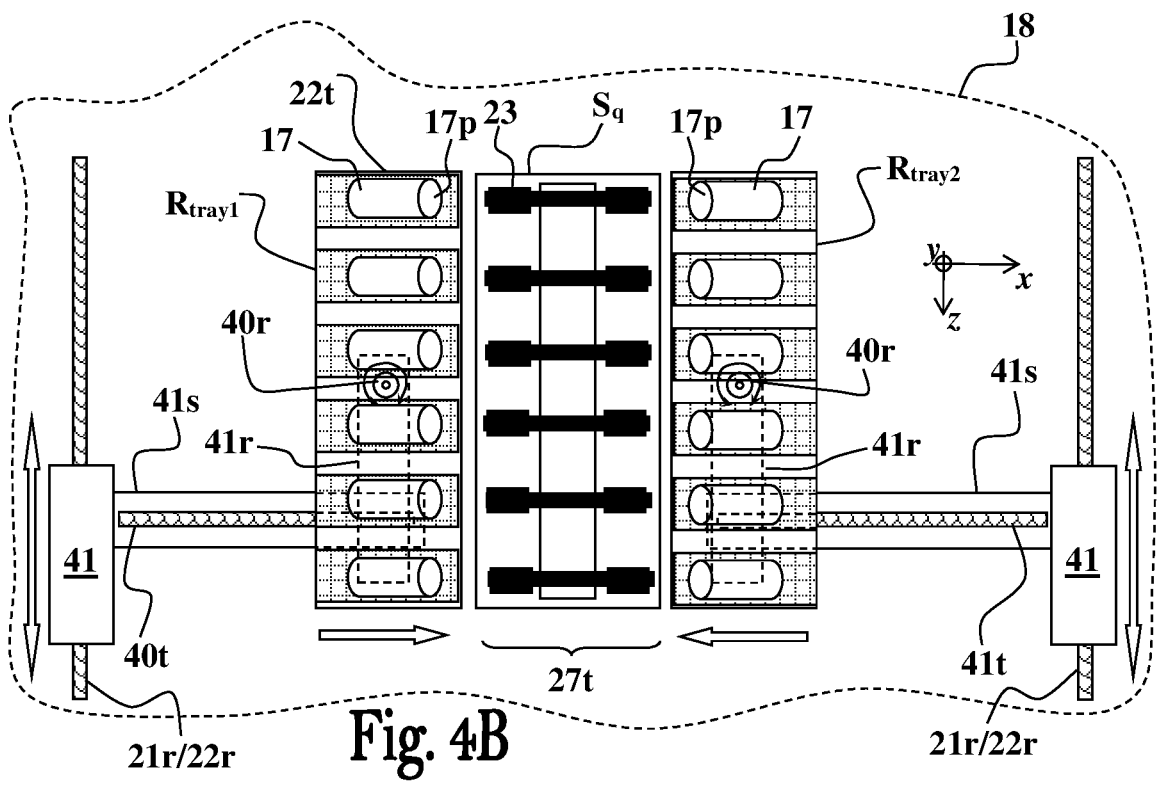

FIGS. 4A and 4B schematically illustrate a possible embodiment of the dispatcher/receiver movable trays 21t/22t of the object server system 20. FIG. 4A shows the dispatcher/receiver movable trays 21t/22t in their server-state near a respective accumulator unit 21a/22b configured to receive/feed a batch of a certain number of objects 17/17' by the closed loop object dispatch/feed carrier 25/26 having a gap g1 between adjacently located objects 17/17'. In this specific and non-limiting example accumulator unit 21a/22b is configured to receive/feed twelve objects 17/17', but in possible embodiments it may be similarly designed to receive/feed a greater, or smaller, number objects 17/17'. In addition, as seen in FIG. 4A, the objects 17/17' can be carried by a plurality of elongated carriers/holders 44 attached spaced apart in fixed distances to the closed loop carrier 25/26 and configured to be received inside the objects 17/17' via their at least one opening 17p. It is however noted that other types of object carriers are also possible, such as, but not limited to, vacuum conveyor, roller conveyor, concaved/convex-shaped conveyor, or suchlike.

As also seen in FIG. 4A, the spacer 21s/22s is configured to adjust the gaps g1 (i.e., conveyor-gap-state) between objects 17/17' adjacently located in the accumulator unit 21a/22b to the gaps g2 (i.e., the object processing-gap-state) defined by the dispatcher/receiver movable trays 21t/22t, and as required for placement of the objects over the grippers (23 in FIG. 4B). The dispatcher/receiver movable trays 21t/22t are attached by a slidable arm 41r to a support member 41s of a slider assembly 41 configured to move over unload/load-rails 21r/22r between the object server system 20 and the portal system (18 in FIG. 4B). Each dispatcher/receiver movable tray 21t/22t is pivotally attached to a respective slidable arm 41r at the axis of rotation 40r, and each of the slidable arms 41r is slidably attached to a respective support member 41s.

Optionally, and in some embodiments preferably, each slidable arm 41r is perpendicularly attached to its respective support member 41s, and the bottom side of each dispatcher/receiver movable tray 21t/22t is pivoted at point 40r located substantially near the free end of the respective slidable arm 41r, to thereby maximize the maneuverability of the dispatcher/receiver movable trays 21t/22t. Accordingly, the dispatcher/receiver movable trays 21t/22t are configured to rotate about their axes of rotation 40r (about the 'y'-axis), and the slidable arms 41r are configured for sliding movement along the length of the support member 41s (i.e., in 'x'-axis directions), for example by means of rail and/or threaded rotatable rod 41t (e.g., sliding nut/leadscrew mechanism).

After a batch of objects 17 is received in the accumulator unit 22a on the object feed carrier 26, the received objects 17 are collected by the spacer unit 22s for adjusting the serial conveyor gaps g1 between adjacently located objects 17 to the object processing gaps g2 defined by the grippers 23 of the support platforms $S_q$. The spacer unit 22s moves the collected objects from the accumulator unit 22a towards the receiver movable trays 22t (i.e., in 'z'-axis direction) being in their server-state, and releases the collected objects 17 when it is located above the receiver movable trays 22t. The movable trays 21t/22t comprise object receiving elements 17c configured to receive the objects and maintain then substantially stationary on the movable trays 21t/22t, while maintaining the object processing gaps g2 between them. The movable trays 22t are then moved over the load-rails 22r towards the portal system 18. The movable trays 22t are also rotated about their axes of rotations 40r, and if needed also slid along the support member 41s to adjust their locations to accommodate at least the array of mandrels 23 between them in their rotated state i.e., their portal-state.

As seen in FIG. 4B, in the portal-state the receiver movable trays 22t are facing each other at two opposite sides of the support platform $S_q$, such that the openings 17p of the objects 17 on one receiver movable tray 22t are facing the openings 17p of the objects 17 on the other receiver movable tray 22t. In the object feed process, after moving the receiver movable trays 22t with the objects 17 thereby carried to the portal system 18, and rotating them to their portal-state for facing each other, the objects 17 are placed over the grippers 23 by sliding the receiver movable trays 22t one towards the other along their respective support members 41s (i.e., in 'x'-axis directions) such that each carried object 17 receives a respective gripper 23 of the support platform $S_q$ via its at least one opening 17p. The grippers 23 can be then changed into a gripping state by adjusting one or more elements thereof to contact inner surfaces of the objects 17, and the receiver movable trays 22t are slid along their support members 41s in sideways opposite directions to disengage the support platform $S_q$ and adjust the distance between them for restoring their serving states.

After placing each collected object 17 over a respective gripper 23 of the support platform $S_q$, the movable trays 22t are rotated about their axes of rotations 40r, and moved back to their server-state (i.e., being substantially parallel to the elongated axis of the spacer unit 22s) at the object server system 20 shown in FIG. 4A. The loaded support platform $S_q$ can then leave the load/unload zone 27t, and a new support platform $S_{q\pm 1}$ can enter the load/unload zone 27t for unloading and/or loading.

With reference to FIG. 1, optionally, and in some embodiments preferably, the portal system 18 is configured to concurrently receive a batch of two or more parallel arrays/streams $R_i$ of objects 17' from the object arrays/parallel transporter 19, and concurrently transfer them over unload-rails 21r to the object dispatcher portion 21 of the object server system 20. In this specific embodiment a batch of two or more parallel arrays/streams $R_i$ of objects 17' moved over the lane 27 by one of the support platforms $S_q$, is received by the portal 18 at the object load/unload zone 27t of the lane 27, and removed from the gripper arrays 23 of the support platform $S_q$ by array collector units 16 (also referred to herein as ejectors) of the portal 18. More particularly, each array/stream of objects $R_i$ is grabbed by a respective one of the two or more array collector units 16 of the portal system 18, and transferred by the collector unit 16 to a respective dispatcher movable tray 21t of the object server system 20, when in their portal-state (shown in FIG. 4B).

The array collector units 16 are configured to move upwardly or downwardly (i.e., in Y-axis directions) along respective vertical guiding rails 18g of the portal system 18 e.g., using rack and pinion mechanisms. In some embodiments each array collector unit 16 is movably attached to a respective vertical guiding rail 18g by an horizontal guiding rail 16r configured to move upwardly or downwardly therealong, and the array collector unit 16 is configured to transversely slide over its respective horizontal guiding rail 16r in sideway directions (i.e., in 'x'-axis directions).

Figure 5A:
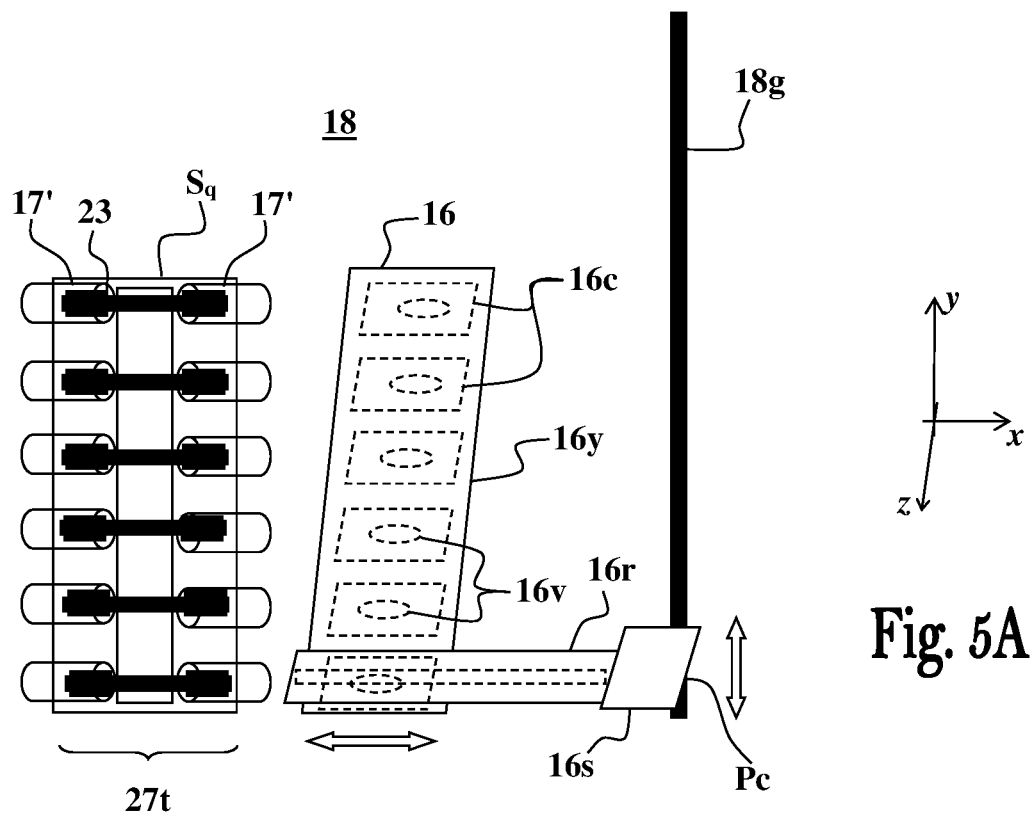
Figure 5B:
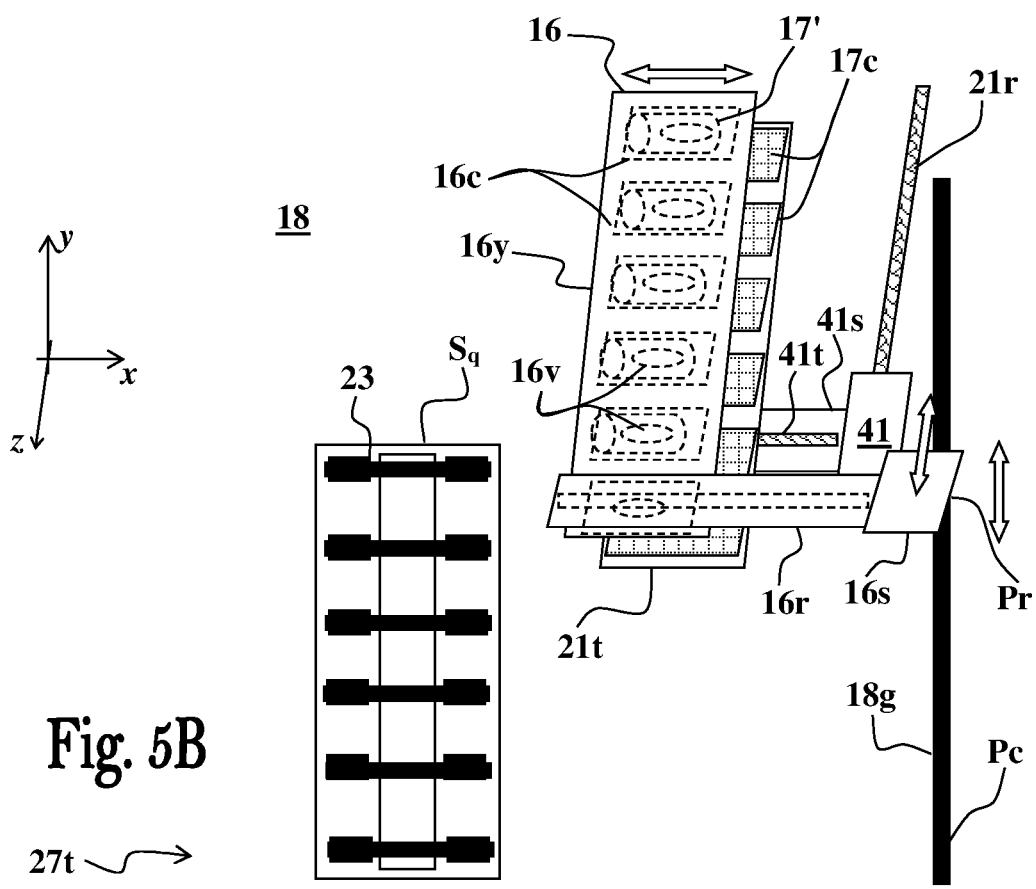

FIGS. 5A and 5B schematically illustrate operation of the array collector units 16 of the portal system 18, according to some possible embodiments. For the sake of simplicity FIGS. 5A and 5B demonstrate the operation of only one array collector unit 16, and the delivery to an array of objects 17' therefrom to a dispatcher movable tray 21t which is referenced in FIG. 1 as $D_{tray2}$. The operation of the other array collector unit 16 in delivery of an array of objects 17' to the other dispatcher movable tray, referenced in FIG. 1 as $D_{tray1}$, is substantially symmetrically the same.

The object array collector unit 16 comprises a collector platform 16y comprising an array of object receiver assemblies 16c, each comprising an object collect unit 16v and configured to grasp and hold one of the objects 17' carried by the grippers 23 of the support platform $S_q$. The collector platform 16y is movably attached to the guiding rail 16r and configured for movement therealong (i.e., in 'x'-axis directions). The guiding rail 16r is attached to an actuator unit 16s configured for linear movement along the vertical guiding rails 18g of the portal system 18 (i.e., in 'y'-axis directions). The portal system is generally configured to move the array collector unit 16 between the object array collecting position shown in FIG. 5A, and the object array release position shown in FIG. 5B.

In this specific and non-limiting example, in the object array collection position Pc shown in FIG. 5A, the array collector unit 16 is located in a lower portion of the guiding rail 18g for approaching the support platform $S_q$ in the load/unload zone 27t for collecting the array of objects 17' carried thereon, and in an upper portion of the guiding rail 18g in the object array release position Pr. It is noted that other configurations can be similarly devised based, mutatis mutandis, on the principles described herein, such as, for example, in which the object array release position is located below, and/or laterally removed from, the object array collection position.

When the array collector unit 16 reaches the object array collection position Pc the collector platform 16y is moved along the guiding rail 16r towards the support platform $S_q$ until reaching a position in which each one of its object collect units 16v is located substantially above, and in close proximity to, a respective one of the objects 17' of the objects array. In this state the array of object collect units 16v provided in the collector platform 16y is activated to apply attraction forces on the objects 17' located therebelow, thereby causing each object 17' of the objects array to be pulled upwardly and/or cling to the respective object collect unit 16v located above it. The collector platform 16y is then moved along the guiding rail 16r away from the support platform $S_q$ while continuously applying the attraction forces by its object collect units 16v, to remove the objects 17' thereby collected from the grippers 23 of the support platform $S_q$. After the collected array of objects 17' is removed from the array of grippers 23 of the support platform $S_q$ the actuator unit 16s is moved upwardly along guiding rail 18g, while continuously applying the attraction forces on the collected objects 17', to thereby move the collected objects therewith to the objects array release position Pr.

When the collector platform 16y reaches the object array release position Pr shown in FIG. 5B, a dispatcher movable tray 21t is moved from a server-state at the object server system 20 along the unload-rails 21r (i.e., in 'z'-axis direction) to the portal system 18. The dispatcher movable trays 21t are rotated about their axes of rotations 40r (i.e., about a Y-axis), and if needed also moved along their support members 41s into their portal-states, wherein they are substantially underneath, and aligned with (i.e., wherein their elongated axes are substantially parallel to the 'z'-axis), the collector platform 16y of the array collector unit 16. When the dispatcher movable tray 21t is stopped underneath the collector platform 16y the object collect units 16v are deactivated to stop the attraction forces applied on the collected objects 17', and thereby release them from the collector platform 16y. Each of the objects 17' released from the collector platform 16y is pulled downwardly by gravitation and received in a respective object receive element 17c of the dispatcher movable tray 21t.

Optionally, and in some embodiments preferably, the collector platform 16y is placed above the dispatcher movable tray 21t such that the objects 17' thereby carried contact the dispatcher movable tray 21t, and the attraction forces applied on the collected objects 17' are then stopped to release the objects 17' onto the dispatcher movable tray 21t.

The dispatcher movable tray 21t is then moved back along the unload-rails 21r to the object server system 20, rotated about its axis of rotations 40r, and if needed moved along its support member 41s, back to its server-state (i.e., wherein its elongated axis is substantially parallel to the elongated axis of the spacer unit 21s), and the actuator unit 16s is moved along the guiding rail 18g back to the objects array collecting position Pc to collect a new array of objects 17' from another support platform $S_{q\pm1}$ entering the load/unload zone 27t.

The object collect units 16v can be configured to apply the attraction forces using suction/vacuum applicators, electromagnets, electric fields applicators, electrostatic forces applicators, or any combination thereof. Optionally, and in some embodiments preferably, each object collect unit 16v comprises at least one suction aperture pneumatically coupled to a vacuum source (not shown) configured to controllably apply and stop the attraction forces applied on the objects 17'.

Referring now to FIGS. 1 and 4A, when the dispatcher movable trays 21t, with the arrays of objects 17' thereby carried, are moved back to the object unload state in the object server system 20, the spacer unit 21s of the object dispatcher portion 21 is moved, while being in, or changed into, the object processing-gap-state, towards the dispatcher movable trays 21t (i.e., in 'z'-axis direction) to position each of its object collect units 37n above and in proximity to a respective one of the objects 17' carried by the dispatcher movable trays 21t. The object collect units 37n are then activated to apply attraction forces and attach each of the carried objects 17' to a respective object collect unit 37n. Concurrently, or shortly thereafter, the accumulator unit 21a is changed into the accumulating-state to accumulate a batch of object carriers (44) in the object transfer zone (33u).

While applying the attraction forces by the object collect units 37n, the spacer unit 21s is changed into the serial conveyor-gap-state, and concurrently, or shortly thereafter, moved back towards the accumulator unit 21a of the object dispatcher portion 21 to place each of the objects 17' attached thereto over a respective object carrier (44) in the object transfer zone (33u) of the accumulator unit 21a via its at least one opening (17p). The object collect units 37n are then deactivated to release the objects attached to the object holders 37 of the spacer unit 21s, and the accumulator unit 21a is changed into the discharge-state to remove the accumulated batch of object carriers, with the objects 17' placed over them, from the object transfer zone (33u) of the accumulator unit 21a.

As shown in FIG. 1 a control unit 28 comprising one or more processors 28c and one or more memory devices 28m is used in some embodiments to control the object server system 20, the portal system 18 and/or the object arrays/parallel transporter 19. In possible embodiments the object server system 20, the portal system 18 and/or the object arrays/parallel transporter 19, comprise various sensor units (not shown) configured and operable to measure and/or determine various states and/or conditions associated with equipment and machinery of the system, generate corresponding indicative sensory and other data/signals, and communicate the same to the control unit 28 over data/signal communication links provided for this purpose (e.g., using serial and/or parallel data/signals wires/bus, and/or wireless data communication).

The sensory data/signals communicated to the control unit 28 is indicative in some embodiments at least about one of the velocities of the conveyors, the positions and/or orientations of the movable trays, the positions of the collector units, the positions and/or states of the spacing units, the states of the accumulator units, the positions and/or velocities of the support platforms, the states of the grippers on each support platform, and/or locations in a batch/array of objects where objects are missing.

The control unit 28 can be thus configured to process the data/signals received from the object server system 20, and/or portal system 18, and/or from the object arrays/parallel transporter 19, and generate corresponding control data/signals for operating/adjusting one or more states of the object server system 20, and/or portal system 18, and/or object arrays/parallel transporter 19. For this purpose data/signal can be communicated between the control unit 28 and the object server system 20 over communication link 28s, between the control unit 28 and the portal system 18 over communication link 28g, and/or between the control unit 28 and the object arrays/parallel transporter 19 over communication link 28t. The data and control communication between the control unit 28 and the object server system 20, and/or portal system 18, and/or object arrays/parallel transporter 19, will be better understood from the processes 60 and 70 illustrated in FIGS. 5C-5H, 6 and 7 described hereinbelow.

Figure 5C:
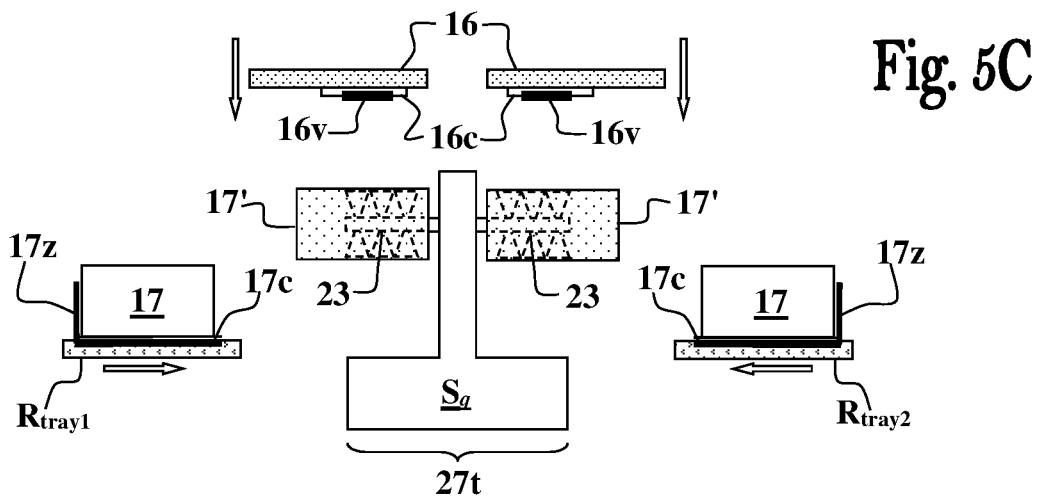

FIGS. 5C-5H schematically illustrate an object unload-load process that can be performed by the control unit (28) to quickly remove arrays of treated objects 17' from a support platform $S_q$ situated at the load/unload zone 27t, and instantly load new arrays of un-treated objects 17 for processing on the support platform $S_q$. As shown in FIG. 5C, immediately after the support platform $S_q$ carrying the treated objects 17' enters the load/unload zone 27t, the receiver movable trays (22t), $R_{tray1}$ and $R_{tray2}$, carrying the un-treated objects 17 are moved (in 'z'-axis direction) from the object server 20 into the load/unload zone 27t, and then they are moved one towards the other (in 'x'-axis directions) to place them at respective sides of the support platform $S_q$ aligned with a respective array of grippers 23 thereof. In order to allow removal of the treated objects 17' from the grippers 23 each receiver movable tray (22t) is placed slightly below the respective array of grippers 23, to clear the way for the sideways movement of the treated objects 17' when removed from the grippers 23 by the array collector units 16.

Figure 5D:
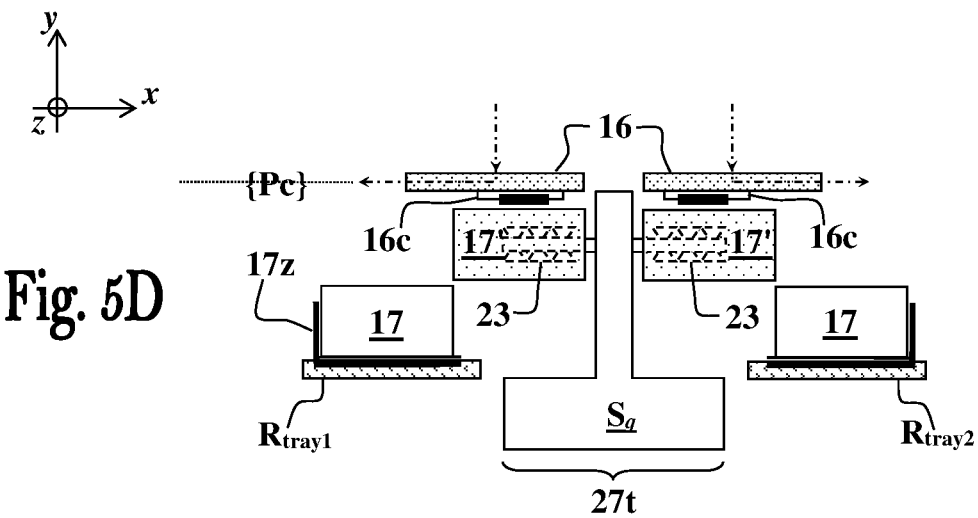

Simultaneously with, or shortly before, moving the receiver movable tray (22t) into the load/unload zone 27t, the array collector units 16 are lowered (in 'y'-axis direction) towards the grippers 23 to place each object receiver assembly 16c in the object array collection position Pc above a respective gripper 23 of the support platform $S_q$, as shown in FIG. 5D. When the array collector units 16 are sufficiently close to the grippers 23 their object collect units 16v are activated to attract to each object collect unit 16v a respective object 17'. At the same time, or shortly before, activating the object collect units 16v, the grippers 23 are changed into an object-release state, in which attachment components thereof are radially retracted to enable removal of the arrays of treated objects 17', and/or placement of new arrays of objects 17 over the mandrels 23.

Figure 5E:
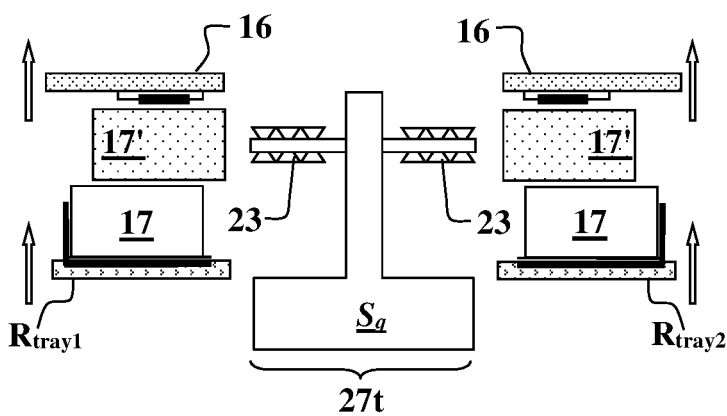

The treated objects 17' are than removed from the grippers 23 by moving the array collector units 16 in opposite sideways ('x'-axis) directions. In FIG. 5E the array collector units 16 and the receiver movable trays (22t) are moved upwardly (Y-axis direction) to move the treated objects 17' out of the way of the trays, to bring each receiver movable tray into an object-load position in front of a respective array of grippers 23. In FIG. 5F the object receive element 17c of each receiver movable tray (22t) is moved towards a respective array of gripers 23, and the array collector units 16 are further moved upwardly to their object array release positions Pr, shown in FIG. 5G. Optionally, and in some embodiments preferably, each object receive element 17c in each receiver movable tray (22t) comprises a respective stopper/arm element 17z configured to hold the object 17 thereon and push it towards the respective gripper 23 when the object receive elements 17c are moved towards the arrays of grippers 23.

In FIG. 5G each un-treated object 17 is placed over a respective gripper 23, the grippers 23 are changed into their object-holding state by radially expanding their attachment components to contact inner surface areas of the objects 17, and the object receive elements 17c are moved in sideways ('x'-axis) directions to restore their original position on the receiver movable trays (22t). In addition, the dispatcher movable trays (21t), $D_{tray1}$ and $D_{tray2}$, are placed under the removed treated objects 17' held by the array collector units 16, and the object collect units 16v of the array collector units 16 are deactivated to remove the attraction forces they apply and release the objects 17' onto the trays, $D_{tray1}$ and $D_{tray2}$. The dispatcher movable trays (21t) are then rotated and moved towards the object server system (20) to place the treated objects 17' over despatcher carriers for removal from the system.

In FIG. 5H the receiver movable trays (22t), $R_{tray1}$ and $R_{tray2}$, are rotated and moved towards the object server system (20) to receive a new batch of un-treated objects 17, the support platform $S_q$ is moved out of the load/unload zone 27t for placing a new support platform $S_{q+1}$ carrying arrays of treated objects 17' in the load/unload zone 27t. The control unit (28) can then perform the steps described above to repeat the unload-load process with the new support platform $S_{q+1}$, and with each new support platform moved into the load/unload zone 27t thereafter.

In some embodiment only the stopper/arm element 17z is configured to move towards the grippers for pushing the objects 17 carried by the receiver movable trays (22t) onto their respective grippers 23. Thereafter, the stopper/arm element 17z are moved back into their object receive state for placing new objects 17 on the receiver movable trays (22t). In some other possible embodiments the stopper/arm element 17z is configured as an independent unit, not being part of the receiver movable trays (22t), and configured to push the objects 17 carried by the receiver movable trays (22t) onto the respective grippers 23 when the receiver movable trays (22t) are properly positioned for transferring the objects 17.

Figure 6:
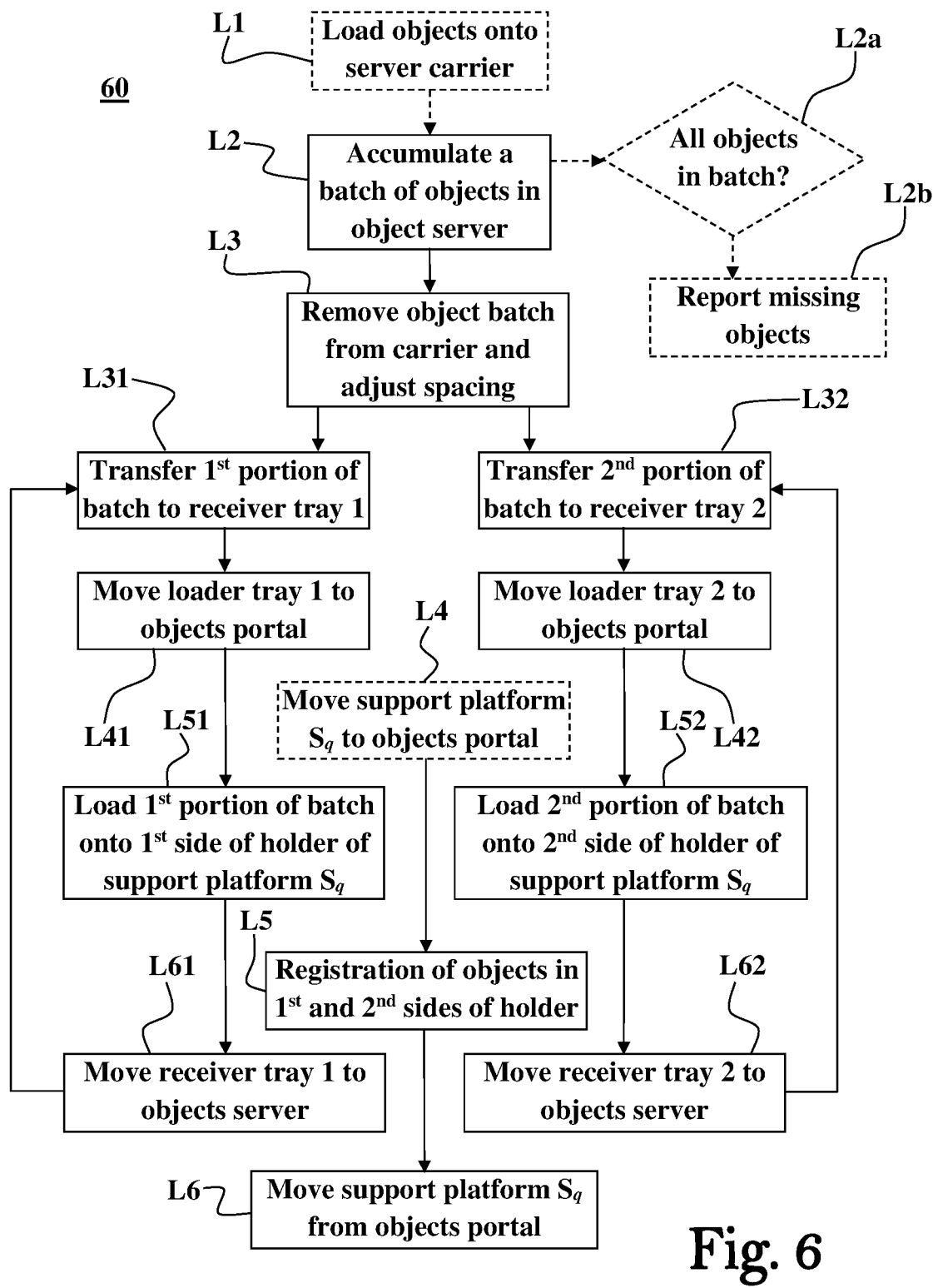
FIG. 6 shows a flowchart illustrating a process of transferring objects from a continuous carrier to an object arrays/parallel transporter/conveyor according to some possible embodiments.

FIG. 6 shows a flowchart illustrating a process 60 that can be carried by the control unit (28) for moving objects (17) from a continuous carrier (26) to an array transporter (19), according to some possible embodiments. The process 60 can optionally comprise a step L1 of loading the objects (17) to the continuous carrier (26) passing in the object server 20 shown in FIG. 1. The objects can be loaded onto the continuous carrier (26) manually, or mechanically using automotive machinery as described and illustrated hereinbelow, or using any other suitable object loader. In some embodiments objects (17) are received already loaded on the continuous carrier (26) e.g., from a product line or an object manufacturing system, and in this case step L1 is not needed. In step L2 the accumulator (22a in the object receiver portion 22) is operated in its accumulating-state to accumulate the batch of objects to be transferred to the array transporter (19). In the optional step L2a it is checked if the number of accumulated objects suffice for a batch, and if one or more objects are missing a respective indication/alert is issued in step L2b.

Optionally, and in some embodiments preferably, the alert/indication issued in step L2a comprises data indicative of the location(s) of the missing object(s), which is used by the control unit (28) for determining which gripper(s) (23) of the support platform ($S_q$), that will be loaded with the new batch of objects, will remain empty/unloaded due to the missing object(s). The control unit (28) is configured to instruct the various processes conducted along the lane (27) that certain gripper(s) of the support platform ($S_q$) are empty/unloaded, and prevent any processing associated therewith e.g., deactivate printing heads located over such empty/unloaded gripper.

Regardless of the outcomes of steps L2a and L2b, in step L3 the accumulated batch of objects (17) is grabbed by the spacer unit (22s) in its conveyor-gap-state and removed from the continuous carrier (26) by the spacer unit (22s). The spacing between the objects are then adjusted by changing the spacer unit (22s) into its object processing-gap-state. As the spacer unit (22s) is changed into its processing-gap-state, or immediately thereafter, the spacer unit (22s) is moved towards the receiver movable trays 22t of the object receiver portion 22 ($R_{tray1}$ and $R_{tray2}$ in FIG. 1), while in their serving-states.

In some embodiments the process steps L1, L2 and L3, are performed repeatedly or periodically, regardless of the other steps of the process 60.

In steps L31 and L32 the spacer unit (22s) releases the grabbed objects onto the receiver movable trays 22t such that each receiver movable tray (22t) receive a certain portion of the batch of objects. In some possible embodiments the objects (17) are supplied to the objects server system 20 a priori in the object processing-gap-state, such that there is no need to adjust/change the spacing/gaps between the objects (17). As described hereinabove and hereinbelow, in such possible embodiments the objects server system 20 is implemented without the spacer unit (22s), and thus step L3 can be skipped by placing the accumulated batch of objects directly on the receiver trays (22t) in steps L31 and L32.

In steps L41 and L42 the receiver movable trays (22t) are moved along the load-rails (22r) to the portal system (18) for transferring at the load/unload zone (27t) the batch of objects thereby carried to a support platform $S_q$. If the support platform $S_q$ is not already in the load/unload zone (27t), in step L4 a support platform $S_q$ is moved thereto, concurrently while, or shortly after, carrying out steps L41 and L42. The receiver movable trays (22t) can be also rotated (about axis of rotations 40r), and moved in sideway directions (along support members 41s) if needed, during, or shortly after, moving them to the portal system (18). After reaching the portal system (18) the receiver movable trays (22t) are located at two opposing sides of the support platform $S_q$ located at the load/unload zone (27t), and they are then moved in steps L51 and L52 towards the support platform $S_q$, thereby sliding an array of objects (17) by each receiver movable tray (22t) over a respective array of grippers (23) of the support platform $S_q$.

In steps L61 and L62 the receiver movable trays (22t) are moved back over the load-rails (22r) to the object server system (20). During their movement, or shortly before or after, the receiver movable trays (22t) are also rotated (about axis of rotations 40r), and moved in sideway directions (along support members 41s) if needed, to restore their server-state. The control can be then moved back to steps L31 and L32 for transferring a new batch of objects (17) to the receiver movable trays (22t).

A registration step L5 can be performed concurrently, shortly before or after, steps L61 and L62. The registration step L5 can comprise angular registration of the objects (17) placed over the grippers/mandrels (23) of a support platform. The angular registration can be carried out using a registration unit (not shown) configured to hold (e.g., using an array of collect units as described hereinabove) an array of the objects (17) loaded over grippers (23) at one side of the support platform $S_q$ substantially immobilized. In this state only the grippers (23) at the other side of the support platform $S_q$ are changed into a gripping state to allow the support platform $S_q$ to apply a certain amount of rotary movement to each of them and rotate each object of the array of objects loaded on them until it becomes substantially aligned with the respective object loaded over the adjacently located gripper at the other side the support platform $S_q$. After each object at one side of the support platform $S_q$ is registered/aligned with the adjacently located object loaded over the adjacently located gripper and the other side of the support platform $S_q$, all grippers (23) are set into their gripping states. Alternatively, the registration steps is carried as described in International Patent Publication No. WO 2018/092143.

One or more sensor units (not shown) can be used in the registration step to identify an alignment mark pre-printed on the objects, and/or a stitch located on the objects (e.g., on a laminate, or three-piece welded object such as can/tube), and/or an unseen visual stitch that has a change in material properties at the stitch area that could be recognized by different type of sensor technology, for allowing properly aligning the objects into the a desired, and/or same, angular position.

In step L6 the support platform $S_q$ is moved from the load/unload zone 27t, with the arrays of objects (17) loaded over its grippers (23), for applying one or more treatment process to external surfaces of the loaded objects.

Figure 7:
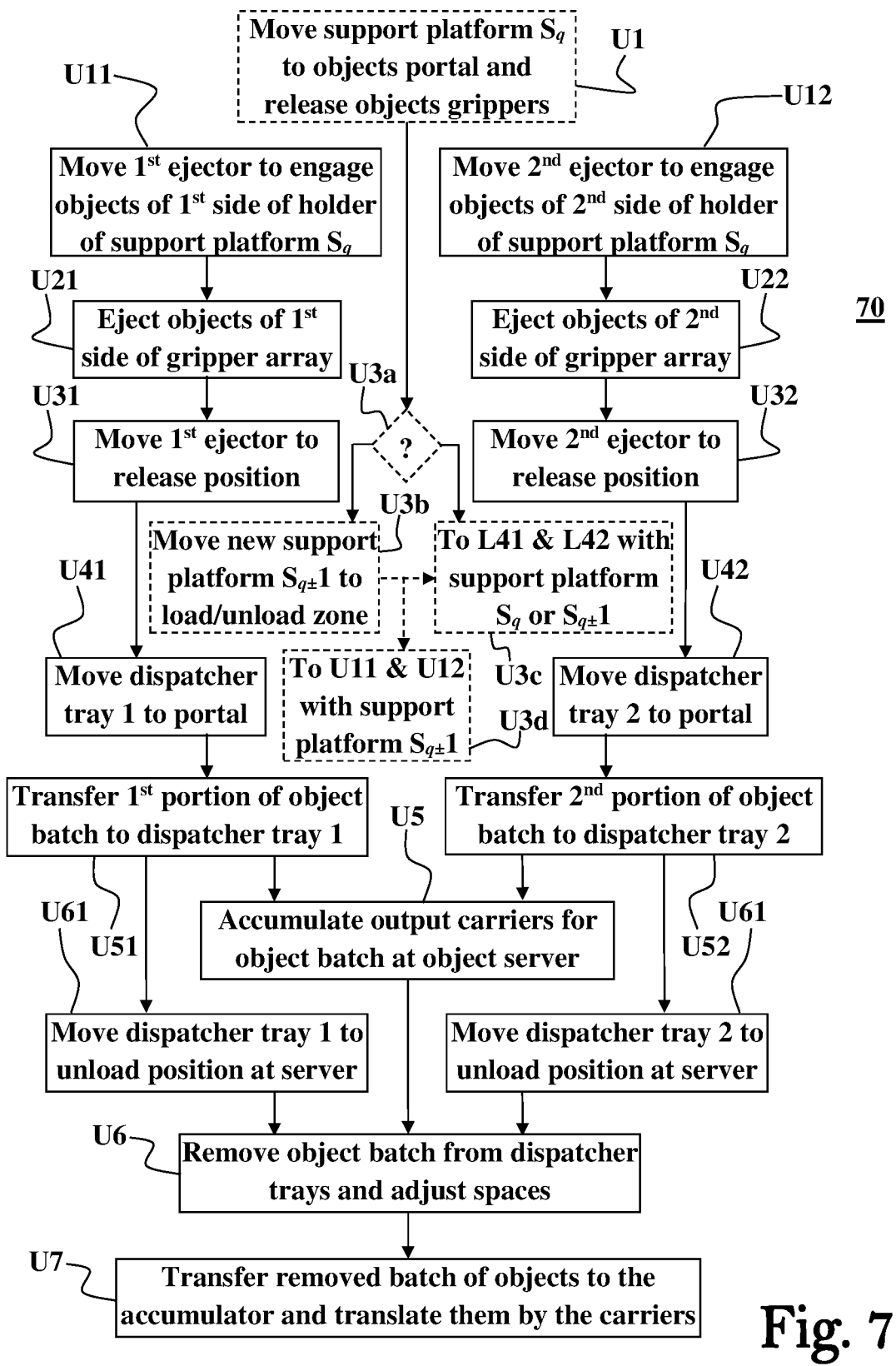
FIG. 7 shows a flowchart illustrating a process of transferring objects from an object arrays/parallel transporter/conveyor to a continuous carrier according to some possible embodiments.

FIG. 7 shows a flowchart illustrating a process 70 that can be carried by the control unit (28) for transferring objects from an array transporter (19) to a continuous carrier (25) according to some possible embodiments. The process 70 optionally starts in step U1 by moving a support platform $S_q$ to the load/unload zone (27t) of the portal system (18), if the support platform $S_q$ is not already in the load/unload zone (27t), and changing its grippers (23) into a non-gripping/release state for disengaging the objects (17') loaded on them. In steps U11 and U12 the array collector units (16) are moved towards the support platform $S_q$ at the load/unload zone (27t), to their object array collection positions (Pc) for placing each of their object collect units (16v) over a respective object (17') carried by the support platform $S_q$, and the object collect units (16v) are activated to apply attraction forces for attaching the objects (17') thereto. In steps U21 and U22 the collector platforms (16y) of the array collector units (16) are moved in opposite sideway directions to thereby slide away the objects (17') from the array of grippers (23) of the support platform $S_q$.

In steps U31 and U32 the array collector units (16) are moved to their object array release positions (Pr), and in steps U41 and U42 the dispatcher movable trays (21t) are moved from the object server system (20) to the portal system (18). While the dispatcher movable trays (21t) are moved from the object server system (20) to the portal system (18), or shortly before, or immediately thereafter, the trays are rotated about their axes of rotation (40r), and if needed also moved along their support members (41s), to change the dispatcher movable trays (21t) into their portal state for receiving the objects carried by the array collector units (16).

The process 70 can carry out a decision step U3a for determining based on the data received over its communication links (28s, 28g and 28t, in FIG. 1) whether to remove the support platform $S_q$ from the load/unload zone (27t) and move a new support platform $S_{q\pm1}$ thereinto in step U3b, or leave the support $S_q$ in the load/unload zone (27t) for further operations in Step U3c. After step U3b, the process 70 may proceed either to step U3d for removing new arrays of objects (17') from the new support platform $S_{q\pm1}$ placed in the load/unload zone (27t), by moving control to steps U11 and U12 of process 70, or to step U3c for loading of new arrays of objects (17) onto the current support platform $S_q$, or onto the new support platform $S_{q\pm1}$, placed in the load/unload zone (27t), by moving the control to steps L41 and L42 of process 60 (shown in FIG. 6).

In steps U51 and U52 the arrays of objects (17') attached to the array collector units (16) are released therefrom by deactivating the object collect units (16v), and each array of released objects (17') is thereby received in a respective dispatcher movable tray (21t). Concurrently, or shortly before, or immediately thereafter, in step U5 a batch of object carriers (44) of the object dispatch carrier 25 is accumulated in the accumulator unit (21a) of the object dispatcher portion (21). In steps U61 and U62 the dispatcher movable trays (21t) are moved back to their server-state, by transiting them over the unload-rails (21r), rotating them about their axes of rotations (40r), and sideway moving them along their support member (41s), if so needed.

In step U6 the spacer unit (21s) is moved towards the dispatcher movable trays (21t) while in its processing-gap-state, collects the objects resting on the trays by activating its object collect units (37n), and adjusts the spaces between the objects by changing into its conveyor-gap-state. In step U7 the spacer unit is moved towards the accumulator unit (21a), while in its conveyor-gap-state, for placing each object (17') of the batch over a respective carrier (44) of the object dispatch carrier (25). The object collect units (37n) of the spacer unit (21s) are deactivated to release the objects (17') thereby attached, and the accumulator unit (21a) is changed into its discharge-state for transiting the carriers (44) out from the accumulator unit (21a) by the object dispatch carrier (25).

In some possible embodiments the spacing/gaps between the object carriers (44) of the object dispatch carrier 25 are set according to the object processing gap dictated by the array transporter, and as described hereinabove and hereinbelow, in such possible embodiments the object server system 20 is implemented without the spacer unit (21s). Accordingly, in this case step U6 is skipped, and the objects (17') are placed over their respective carriers (44) directly by the dispatcher movable trays (21t) in step U7.

Optionally, but not necessarily, the closed loop object carriers 25 and 26 are part of production line(s). Alternatively, in some possible embodiments the closed loop object feed carrier 26 is a type of endless belt conveyor, or roll down table, configured to receive the objects 17 from an optional carrier load/unload unit 29, and introduce the received objects into the system 100 via the server system 20. Accordingly, in some possible embodiments the optional carrier load/unload unit 29 shown in FIG. 1 is not required, and thus not incorporated into the system 100 e.g., if the serial object carrier 26 is a chain carrier conveyor system that supplies a continuous steam of objects 17 to the system 100 from a manufacture process.

Figure 8A:
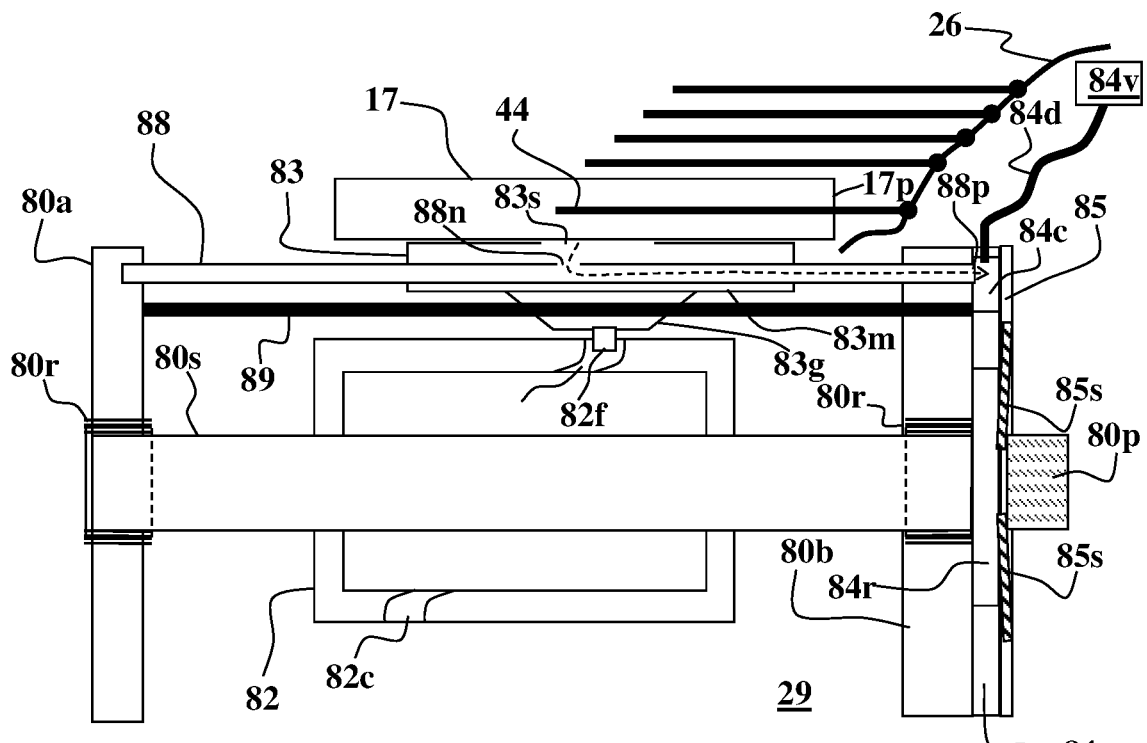
Figure 8B:
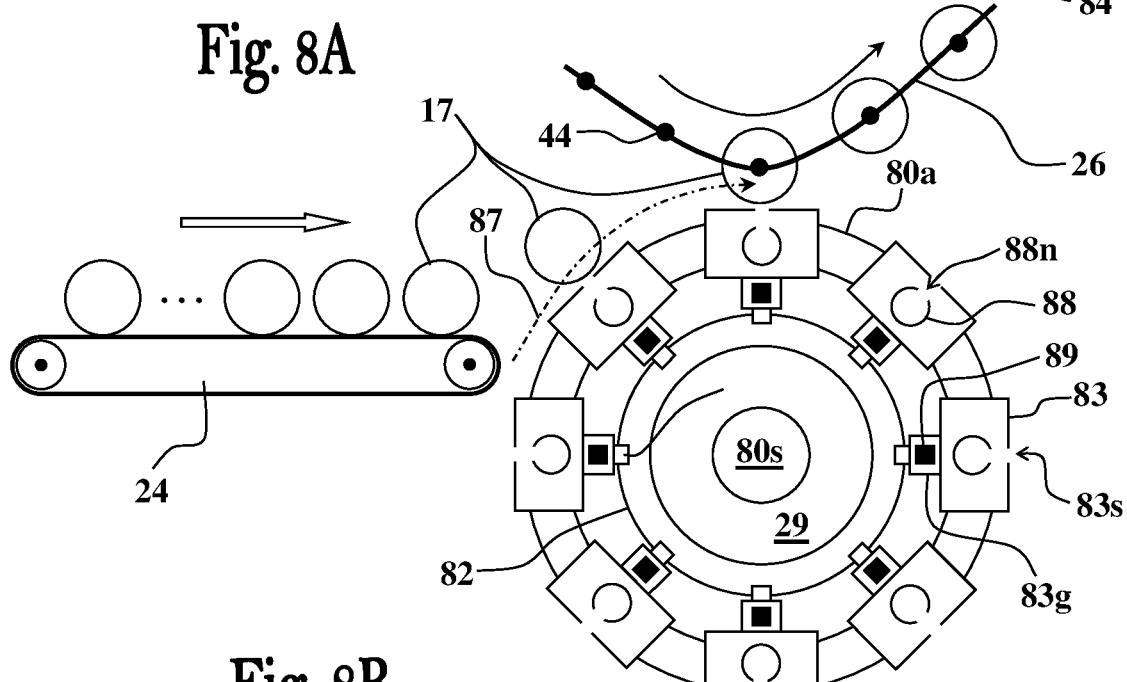

FIGS. 8A and 8B schematically illustrate a carrier load/unload unit 29 according to some possible embodiments. As seen in side sectional view of FIG. 8B, the carrier load/unload unit 29 can be used for transferring a serial stream of objects 17 received on a belt conveyor 24 onto the closed loop object feed carrier 26 of the system. The carrier load/unload unit 29 comprises a plurality of object receiver units 83 configured to rotate about a central axle 80s and apply attraction forces when passing an arc section 87 of their rotary movement, extending between an extremity of the belt conveyor 24 and the closed loop object feed carrier 26.

Thus, whenever an object receiver unit 83 of the carrier load/unload unit 29 approaches the beginning of the arc section 87, near the edge of the belt conveyor 24, the object receiver unit 83 starts applying the attraction forces to attach thereto an object 17 arriving over the belt conveyor 24. The object 17 is thereby transferred from the belt conveyor 24 to the carrier load/unload unit 29, and travels on object receiver unit 83 to which it is attached the arc section 87, until it reaches the closed loop object feed carrier 26 and placed on one of its carriers 44. In the specific and non-limiting example of FIG. 8B the carrier load/unload unit 29 comprise eight object receiver units 83, but it may be similarly designed to incorporate greater, or smaller, number of the receiver units 83.

The receiver units 83 can be configured to apply the attraction forces using suction/vacuum applicators, electromagnets, electric fields applicators, electrostatic forces applicators, or any combination thereof. Optionally, and in some embodiments preferably, each receiver unit 83 comprises at least one suction aperture 83s pneumatically coupled to a vacuum source (not shown) configured to affect the attraction forces applied on the object 17 collected by the receiver unit 83.

FIG. 8A is a schematic illustration showing an elongated sectional side view of the carrier load/unload unit 29. For the sake of simplicity and clarity only one object receiver unit 83 is shown in FIG. 8A. The carrier load/unload unit 29 in some embodiments comprises two disk-shaped elements, 80a and 80b, located at the extremities of, and configured to rotate about, a central axle 80s. The central axle 80s is configured to remain stationary immobilized, and the disk-shaped elements, 80a and 80b, are configured in some embodiments to rotate thereabout by means of bearings 80r.

A barrel 82 is fixedly attached to the central axle 80s, substantially between the disk-shaped elements, 80a and 80b.

Each of the object receiver units 83 is mounted in the carrier load/unload unit 29 for sliding movement over elongated tube 88 and rail 89, fixedly attached to, and between, the disk-shaped elements, 80a and 80b for rotary movement about the central axle 80s. The elongated tube 88 is substantially parallel to the rail 89, and they are both mounted in parallel to the central axle 80s. The object receiver unit 83 comprises a hollow main body 83m sealably mounted for sliding movement over the elongated tube 88, and configured to maintain pressure conditions affected thereinside via an opening 88n of the elongated tube 88. The object receiver unit 83 can further comprise a linear guiding element 83g fixedly attached to a bottom side of the hollow main body 83m, and configured to linearly slide over the elongated rail 89. A follower element 82f is attached to a bottom side of the guiding element 83g and movably engaged inside a closed-loop wavy guide channel 82c formed in the outer surface of the barrel 82.

The barrel 82 with its closed-loop wavy guide channel 82c, and the follower element 82f, implement a barrel-cam-follower configured to reciprocate the object receiver units 83 in sideway directions (i.e., move left-to-right and then from right-to-left) over the elongated tube 88 and rail 89, as the disk-shaped elements, 80a and 80b, are rotated about the axle 80s. The barrel-cam-follower is configured to place the object receiver units 83 near the disk-shaped elements, 80a for object collection from the belt conveyor 24, and thereafter move the object receiver unit 83 with the object 17 attached thereto towards the disk shaped element 80b.

The barrel-cam-follower mechanism and the closed loop object feed carrier 26 are synchronized such that whenever the object receiver unit 83 is moved towards the disk shaped element 80b with an object 17 attached thereto, a carrier element 44 of the closed loop object feed carrier 26 is readily positioned in place to receive the object 17 thereover via its at least one opening 17p. At this state the attraction forces applied by the object receiver unit 83 are stopped, and the objects is moved by the feed carrier 26 from the carrier load/unload unit 29 to the object server system 20. Thereafter, as the disk-shaped elements, 80a and 80b, are further rotated to complete a full cycle, the object receiver unit 83 is moved away from the arc section 87, and the barrel-cam-follower returns the object receiver unit 83 to the other side of the unit, near the disk-shaped elements, 80a, for receiving a new object 17 from the belt conveyor 24.

The disc-shaped element 80b is configured to rotate over a pressure transfer plate 84 firmly and sealably abutted thereto. The pressure transfer plate 84 comprises a pressure transfer channel 84c extending along a circular path therein along an arc section corresponding in location and angular size to the arc section 87 extending between the belt conveyor 24 and the closed loop object feed carrier 26. The pressure transfer channel 84c is sealably closed by a sealing plate 85 fixedly and sealably attached to the pressure transfer plate 84.

The pressure transfer channel 84c is connected to a vacuum source (84v) by a conduit 84d slideably coupled thereto. Each of the elongated tubes 88 comprises an opening 88p configured to communicate pressure with the pressure transfer channel 84c whenever traversing the arc section 87. In this way, the vacuum pressure conditions obtained inside the pressure transfer channel 84c via the conduit 84d are communicated to the elongated tubes 88 when they traverse the arc section 87, and thereby communicated into the main body 83m of the object receiver unit 83, via the opening 88n in the elongated tubes 88. The pressure conditions communicated into the main body 83m of the object receiver unit 83 apply the attraction forces for attaching the object 17 thereto when it is traversing the arc section 87.

In some embodiments an inner portion of the sealing plate 85 is configured to form a plurality of integral torsion leaf springs 85s elastically bendable into a circular cavity 84r formed in a central region of the pressure transfer plate 84. In this way, a fastening element 80p configured to press and bend the torsion leaf springs 85s into the cavity 84r, can be used to firmly press the assembly formed by the pressure transfer plate 84 and the sealing plate 85 fixedly attached to it, against the disk-shaped element 80b, while enabling the rotary motion of the disk-shaped element 80b.

Figure 9B:
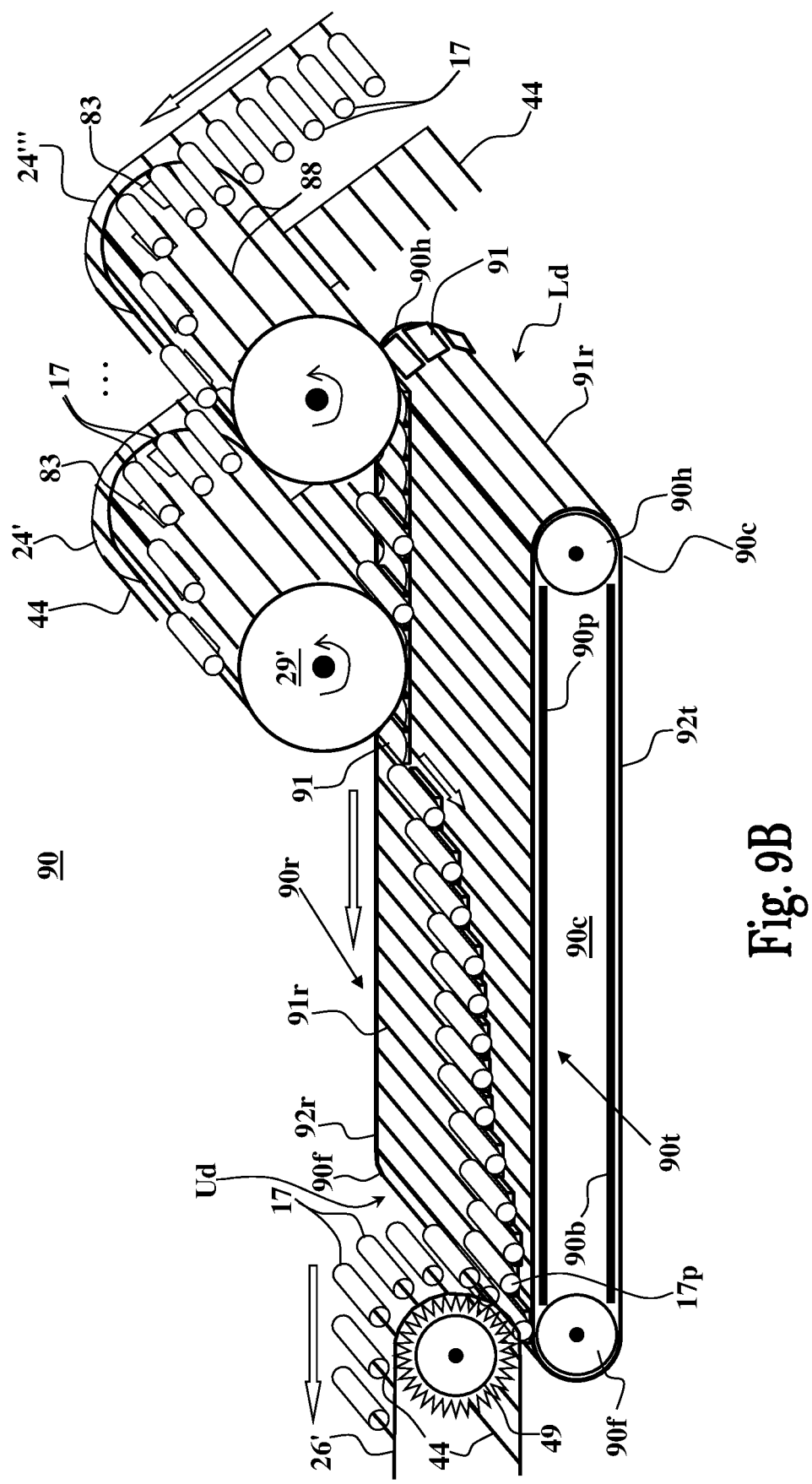
Figure 9C:
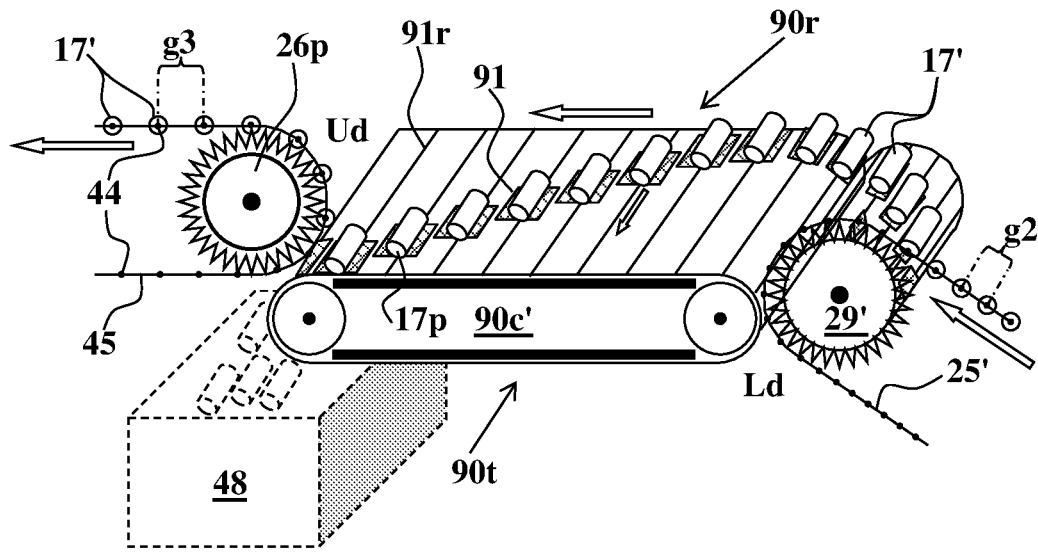

FIGS. 9A to 9C schematically illustrate an object portation system 110 utilizing intermediating system(s) 90/90' to intermediate between serial supply conveyor system(s) 24' . . . 24'''/45 and an interfacing system 20'. As shown in FIG. 9A interfacing system 20' of the object portation system 100 comprises an object receiver portion 22', and an object dispatcher portion 21', that are substantially similar to object receiver and dispatcher portions, 21 and 22, of the interfacing system 20 shown in FIG. 1, except that they don't include spacer units. This implementation of the object receiver and dispatcher portions, 21' and 22', is achieved due to the pace adjustment system(s) 90 and 90' configured to adjust the spacing/gaps between the objects 17 before they are supplied to the object server system 20' over the feed chain 26', and to adjust the spacing/gaps between the treated objects 17' after they are dispatched from the object server system 20' over the dispatch chain 25'.

In this way the spacing/gaps between the object carriers (44) of the object feed and dispatch chains, 26' and 25', passing in the object server system 20', are set according to the object processing gap g2 dictated by the array transporter i.e., according to spacing/gaps between adjacently located grippers (23) in the same row of arrays of gripper of the support platform ($S_q$). FIG. 9A shows a possible embodiment wherein the intermediating system 90 is configured to receive objects 17 from a plurality of serial conveyor systems, which in other embodiments can be similarly used to receive objects 17 from a single serial conveyor system.

At the object supply side of portation system 110 the pace adjustment system 90 is configured to receive a plurality of serial streams of objects 17 over the serial supply conveyor systems 24', 24'' . . . 24''', each having a respective different (or the same) spacing/gaps g', g'' . . . g''', between the objects thereby carried. Each serial supply conveyor system 24', 24'' . . . 24''' is coupled to a respective carrier unloader system (also referred to herein as object reciprocating drum systems) 29', 29'' . . . 29''' configured to remove the objects 17 from the respective serial conveyor system and transfer them to a (side-to-side) reciprocating and horizontal transport conveyor system 90c. The carrier unloader systems 29', 29'' . . . 29''' are substantially similar to the carrier loader system 29 shown in FIGS. 8A and 8B, except that their operation is reversed i.e., instead of loading objects onto objects carriers of the conveyor system, they unload the objects received via the supply conveyor systems 24', 24'' . . . 24''', and transfer them to the reciprocating conveyor system 90c.

The objects 17 transferred to the reciprocating and horizontal transport conveyor system 90c are moved therealong towards a sprocket wheel 49 over which the feed chain 26' is mounted for movement. While the objects 17 are moved along the reciprocating conveyor system 90c they are also transversely moved along at least some portion of the length of the reciprocating conveyor system 90c, from one side thereof to the other. The sprocket wheel 49 and feed chain 26' are configured to move a portion of the feed chain 26' in alignment and synchronization with the moving bars 91r of the reciprocating conveyor system 90c, such that each object 17 moved by the reciprocating conveyor system 90c is placed on an object carrier (44) of the feed chain 26', as it approaches the object transfer side 90t near the unload end Ud.

The spacing/gaps between the objects 17 carried by the feed chain 26' is the processing object gap g2 dictated by the support platforms $S_q$. The feed chain 26' moves the objects 17 placed over its object carriers (44) to the accumulator 22a of the object receiver portion 22' of the objects server 20' for portation by the moving trays 22t to the portal system 18.

The reciprocating conveyor system 90c comprises a plurality of moving bars 91r configured for consecutive movement, one after the other, from objects load end Ld, wherein the objects 17 are removed from the serial supply conveyor systems 24', 24" . . . 24'" and transferred to the reciprocating conveyor system 90c, to objects unload end Ud, wherein the objects 17 are moved from the reciprocating conveyor system 90c by the sprocket wheel 49 and the feed chain 26'. Each moving bar 91r comprises a slidable object cradle 91, configured to slide over its moving bar 91r from an object receive side 90r to an object transfer side 90t, of the system 110, along at least some portion of the length in which the moving bar 91r travels from objects load end Ud to the object unload end Ud.

This way, each object cradle 91 receives thereon a single object 17 from one of the supply serial conveyor systems 24', 24" . . . 24" at the object receive side 90r near the load end Ld, holds the received object 17 thereon and move it to the object transfer side 90t to transfer it to the feed chain 26' near the unload end Ud. This is achieved by properly adjusting the velocity of movement of the moving bars 91r to the velocities of the serial supply conveyor systems 24', 24" . . . 24", and synchronizing them such that whenever an object 17 is released by one of the serial supply conveyor systems 24', 24" . . . 24" an empty object cradle 91 of the reciprocating conveyor system 90c is placed to receive and hold it for transfer to the feed chain 26'.

In some possible embodiments the object cradles 91 are configured to apply attraction forces on the objects 17 they receive (e.g., by suction/vacuum, electromagnet, electric field, electrostatic forces, or any combination thereof). For example, is some embodiments the moving bars 91r are hollow elements configured to communicate vacuum from a pressure source (not shown) to their respective object cradles 91. The object cradles 91 can be configured similar to the object receiver units 83 of the carrier loader system 29 shown in FIGS. 8A and 8B, for receiving the vacuum communicated by the moving bars 91r for application of attraction forces over the objects 17 thereby carried via respective suction apertures (not shown).

In some embodiments the intermediating system 90 can be used to combine a plurality of streams objects 17 received from serial supply conveyor systems 24', 24" . . . 24'", having a same spacing/gaps g', g" . . . g'", between the objects 17, into one stream of objects 17 delivered to the object server system 20' via the feed chain 26'. Namely, in some embodiments the serial supply conveyor systems 24', 24" . . . 24'", are configured to supply two or more streams of objects having a certain spacing/gaps g'=g"= . . . =g'" between them, which may be different from the processing object gap g2≠g'=g"= . . . =g'", or substantially equal to g2=g'=g"= . . . =g'".

At the object depart side of portation system 110 the treated objects 17' are moved from the accumulator 21a of the object dispatcher portion 21' over the dispatch chain 25' to another carrier unloader system 29', configured to remove the treated objects 17' from the dispatch chain 25' and transfer them to the (side-to-side) reciprocating and horizontal transport conveyor system 90c'. The spacing/gaps g2 between the treated objects 17' moved over the dispatch chain 25' are substantially the same object processing gap g2 between the objects 17 moved over the feed chain 26'. Similar to the reciprocating conveyor system 90c, the reciprocating conveyor system 90c' also utilizes a plurality of movable bars 91r configured to consecutively move therealong from an object load end Ld to an object unload end Ud, where each movable bar 91r carries a respective slidable object cradle 91 configured to slide thereover from an object receive side 90r near the object load end Ld to an object transfer side 90t near the object unload end Ud.

Each slidable object cradle 91 is configured to receive a treated object 17' from the carrier unloader system 29' at the object receive side 90r near the load end Ld, and move the received object 17' to the object transfer side 90t as its movable bar 91r travels to the unload end Ud. At the object unload end Ud a sprocket wheel 26p and depart chain 45 engaged therewith are used to remove the treated objects 17' from the reciprocating conveyor system 90c' and place them on object carriers (44) of the depart chain 45. For this purpose at some portion of the depart chain 45 is aligned, and configured for synchronous motions, with the moving bars 91r of the reciprocating conveyor system 90c', such that as a treated object 17' approaches the object transfer side 90t near the unload end Ud it is placed over an object carrier (44) of the depart chain 45.

As demonstrated in FIG. 9A, the spacing/gaps g3 between the treated objects 17' placed on the depart chain 45 can be different from processing object gap g2 of the feed chain 26' and the dispatch chain 25', and dictated by the grippers (23) of the support platforms ($S_q$). This specific and non-limiting example demonstrates an embodiment wherein the spacing/gaps g3 of the depart serial conveyor system 45 is smaller than the processing object gap g2 (i.e., g3<g2), but the intermediating system 90' can be configured in other embodiments to place treated objects 17' on a depart chain 45 having spacing/gaps g3 that are greater than the processing object gap g2 (i.e., g3>g2). If the spacing/gaps g3 of the depart chain 45 are equal to the processing object gap g2 (i.e., g3=g2), then the system can be implemented without the reciprocating conveyor system 90c'.

The control unit 28 can be configured to communicate signals/data 28x for monitoring and controlling the operation of the intermediating system 90 and/or its reciprocating conveyor system 90c, to guarantee that it is synchronized with the object delivery rates of the serial supply conveyor systems 24', 24" . . . 24'" and with the object transfer rate of feed chain 26'. Various sensors units (not shown) can be used in the reciprocating conveyor systems for measuring and/or generating data/signals indicative of the states and/or conditions of equipment/machinery of the reciprocating conveyor systems, and communicate the same to the control unit 28.

For example, is some embodiments the control unit 28 is configured to generate signals/data 28x for adjusting the velocity of movement of the moving bars 91r to guarantee that the objects 17 are received with the required spacing/ gaps g2 of the feed chain 26'. Accordingly, the control unit 28 can be configured to generate signals/data 28x for adjusting the velocity of movement of the moving bars 91r to deliver the objects to the feed chain 26' in spacing/gaps that are different from the processing gaps g2.

Likewise, the control unit 28 can be configured to communicate signals/data 28y for monitoring and controlling the operation of the intermediating system 90' and/or its reciprocating conveyor system 90c', to guarantee that it is synchronized with the object delivery rate of the dispatch chain 25' and with the object transfer rate of the depart chain 45. In some embodiments the control unit 28 is configured to generate the signals/data 28y for adjusting the velocity of movement of the moving bars 91r to guarantee a desired spacing/gaps g3 of the objects 17 collected by the depart chain 45.

FIG. 9B illustrates a reciprocating and horizontal transport conveyor system 90c usable for intermediating between a plurality of serial feed conveyor systems 29' . . . 29''', and the feed chain 26' of the object server system 20'. In this embodiment the reciprocating and horizontal transport conveyor system 90c is implemented in a form of an endless conveyor having at the object load end Ld two sprocket wheels 90h, at the receive 90r and transfer 90t sides thereof respectively, and at the object unload end Ud two sprocket wheels 90f, at the receive 90r and transfer 90t sides thereof respectively. The sprocket wheels 90h and 90f at the transfer side 90t are configured move a transfer side chain 92t, and sprocket wheels 90h and 90f at the receive side 90r are configured move a receive side chain 92r. The moving bars 91r are attached between the receive and transfer side chains, 92r and 92t, one parallel to the other. The receive and transfer sides chains, 92r and 92t, and or the sprocket wheels 90h and 90f, are mechanically coupled to an actuating unit (e.g., electric motor and gear system, not shown) configured to rotate the sprocket wheels 90h and 90f in a determined direction for moving the parallel bars 91r in a consecutive manner from the object load side Ld to the object unload side Ud.

The reciprocating conveyor system 90c comprises one or more upper guiding rails 90p mechanically coupled (e.g., by respective follower elements) to the object cradle 91 moved over the upper side of the conveyor for laterally sliding them from the object receive side 90r to the object transfer side 90t, as they are moved by their respective moving bars 91r towards the unload end Ud. If more than one upper guiding rail 90p is used, the rails can be configured to coincide into a single common guiding rail towards the unload end Ud. One or more bottom guiding rail 90b can be similarly used to slide the object cradle 91 moved over the bottom side of the conveyor for laterally sliding them from the object transfer side 90t to the object receive side 90r, as they are moved by their respective moving bars 91r towards the load end Ld. The guiding rails 90p and 90b can be principally similar to the guide channel 82c used in the carrier loader system 29 shown in FIGS. 8A and 8B.

As demonstrated in FIG. 9B, the reciprocating conveyor system 90c can receive one or more streams of objects 17 via respective one or more unloader systems 29', . . . , 29''' located at the object receive side 90r near the load end Ld. Each unloader system 29', . . . , 29''' is configured to hold the objects 17 received at one side thereof via a respective supply chain carrier 24', . . . , 24''', on object receiver units 83. Each object receiver unit 83 is configured to laterally slide towards the other side of the unloader system, while its respective barrel (82 in FIGS. 8A and 8B) is rotated. Each object 17 is released from the object receiver unit 83 on which it is carried onto one of the object cradles 91 of the reciprocating conveyor system 90c. As the objects 17 reach the object transfer side 90t, near the unload end Ud, they receive one of the object carriers 44 of the feed chain 26' via their openings 17p, and then moved away from the reciprocating conveyor system 90c by the feed chain 26'. The sprocket wheel 49 is configured to align a portion of the feed chain 26' with the moving bars 91r and move the object carriers 44 is synchronization therewith to guarantee all of the objects 17 reaching the unload end Ud are received over the object carriers 44.

FIG. 9C illustrates a reciprocating and horizontal transport conveyor system 90c' configured to receive a stream of treated objects 17' from the interfacing system (20'), over the dispatch chain 25' and a carrier unloader system 29', with the processing gaps g2 between the objects 17', and transfer them to the depart chain 45 having a different spacing/gaps g3 between the objects 17'. As seen, the operation of the reciprocating conveyor system 90c' is principally similar to that of reciprocating conveyor system 90c, except that it receives a single stream of treated objects 17' and adjusts the spacing/gaps therebetween to the spacing/gaps of an external carrier 45 e.g., of a production line.

Particularly, each treated object 17' is removed from the dispatch chain 25' as it become engaged with an object cradle 91 at the object receive side 90r near the load end Ld of the reciprocating conveyor system 90c', which in turn moves the treated objects 17' thereby carried to the object transfer side 90t as it is moved by its respective moving bar 91r towards the unload end Ud. The sprocket wheel 26p is configured to align and synchronize a portion of the depart chain 45 with the moving bars 91r, such that the object carriers 44 of the depart chain 45 receive a treated object 17' as it approaches the object transfer side 90t of the reciprocating conveyor system 90c'. The treated objects 17' received over the object carriers 44 are then removed from the reciprocating conveyor system 90c' by the depart chain 45.

As also demonstrated in FIG. 9C, if it is not required to transfer the treated objects 17' onto another carrier/conveyor, they can be simply dropped into/onto suitable means for manual processing e.g., for packaging. For example, the treated objects 17' can be dropped by the conveyor 90c' directly into containers 48, and in this case the conveyor 91c' can be implemented by a simple belt conveyor, since the side-to-side movement of the objects is not required.

Optionally, and in some embodiments preferably, length of the moving bars 91r is determined according to the spacing/gaps required by the feed/depart chain 26'/25'. Accordingly, in some embodiments the spacing/gaps between the objects transferred by the reciprocating and horizontal transport conveyor systems 90c/90c' to the feed/depart chains is defined by the length of the moving bars 91r, and thus the length of the moving bars 91r used in the reciprocating conveyor system 90c can be different from the length of the moving bars 91r used in the reciprocating conveyor system 90c'.

Figure 10A:
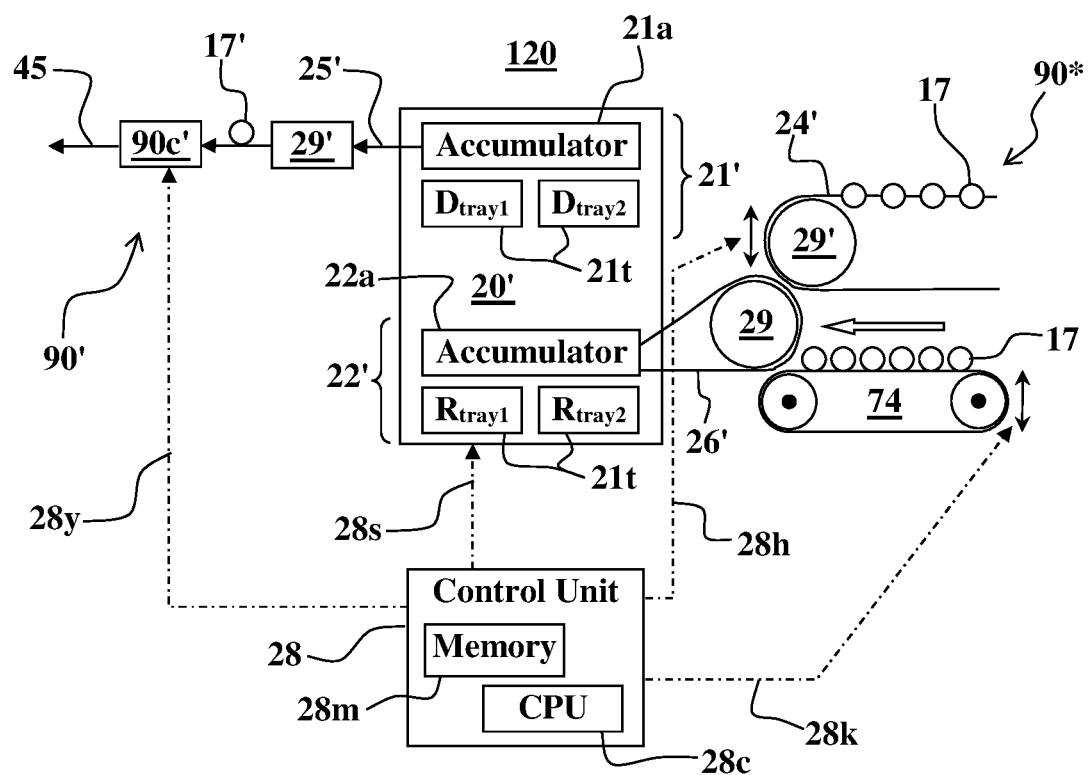

FIG. 10A schematically illustrates an object portation system 120 according to some possible embodiments, capable of selectively receiving a manual feed of objects 17 supplied by a belt conveyor system 74, or a serial stream of objects 17 supplied by a serial supply conveyor system 24'. The pace adjustment systems 90* and interfacing system 20' of object transport system 120 are structured to function similar to the pace adjustment systems 90' and interfacing system 20' of the object portation system 110, and for the sake of brevity will not be described again. The object supply part 90\* of object portation system 120 is configured for supplying via the carrier loader system 29 either objects 17 manually placed on the belt conveyor 74 or the stream of objects 17 supplied by the serial supply conveyor system 24'.

In a first mode of operation, the carrier loader system 29 attracts and carry by its object receiver units (83), shown in FIGS. 8A and 8B) the objects 17 transported thereto by the belt conveyor system 74, as described hereinabove with reference to FIG. 8B. The carrier loader system 29 rotates and transversely slides the object receiver units (83) towards the object carriers (44) of the feed chain 26', which transport the objects to the accumulator 22a of the object receiver portion 22' of the interfacing system 20'.

In a second mode of operation the carrier loader system 29 receives the objects 17 from the serial supply conveyor system 24' via the carrier unloader system 29', as described hereinabove with reference to FIGS. 9A and 9B. The objects 17 are attracted and attached to the object receiver units (83) of the carrier unloader system 29' at one side thereof, which rotates and transversely slide the object receiver units (83) to its other side. The object 17 reaching the other side of the carrier unloader system 29' is released from the object receiver unit (83) by which it is carried, onto an object receiver unit (83) of the carrier loader system 29, which rotates and transversely slides the object 17 towards an object carrier (44) of the feed chain 26' for moving it to the accumulator 22a of the object receiver portion 22'.

Thus, as in the portation system 110, the spacing/gaps between the object carriers (44) of the object feed and dispatch chains, 26' and 25' passing in the object server system 20', are set according to the object processing gap (g2) dictated by the array transporter.

In some embodiments the carrier unloader system 29' is configured to be vertically elevated or lowered for adjusting its distance from the carrier loader system 29 with respect to the diameter of the objects 17. Similarly, the belt conveyor system 74 can be vertically elevated or lowered for adjusting its distance from the carrier loader system 29 with respect to the diameter of the objects 17. In this way the object supply part 90\* of object portation system 120 can be adjusted to transport objects having different diameters in its first and second modes of operation. As shown in FIG. 10, the control unit 28 can be configured to generate control signals 28k and 28h for actuating the vertical elevation or lowering of the belt conveyor system 74 and the carrier unloader system 29', respectively, to adjust the object supply part 90\* to object of different geometrical dimensions (e.g., having greater or smaller diameters).

FIG. 10B shows a possible configuration of the object supply part 90\* wherein the object reciprocating drum 29 is situated above the object reciprocating drum 29'. In this specific and non-limiting example the serial supply conveyor system 24' supplies the objects 17 to object receiver units (83) at a bottom side of the object reciprocating drum 29' at a chain coupled end Ch thereof. The object reciprocating drum 29' is rotated to move the objects 17 carried thereon to its upper side while simultaneously moving them laterally to an object transfer end Tr thereof, wherein the objects 17 are detached from the object reciprocating drum 29' and attached to object receiver units (83) of the object reciprocating drum 29. As seen, the object reciprocating drum 29 can be rotated in an opposite rotation direction of the object reciprocating drum 29'. The rotary movement of the object reciprocating drum 29 moves the objects 17 to the upper side of the object reciprocating drum 29 while simultaneously moving them laterally to a chained coupled end Ch thereof, wherein they are placed over the carriers 44 of the feed conveyor system 26'.

Accordingly, the objects 17 are moved laterally by the object reciprocating drum 29' to the transfer side Tr, and then moved back by the object reciprocating drum 29 to the chain coupled side Ch, such that they can be placed via their openings at 17p over the carriers 44. Since the same end opening 17p of the objects 17 is used to introduce the carriers 44 of both chains, 24' and 26', into the objects 17, the other end of the objects 17e can be closed. This also applies in the system shown in FIG. 9C, for example.

The objects 17 are supplied to the object reciprocating drum 29' over the serial supply conveyor system 24' with the serial conveyor gap g1, which is adjusted during the transfer of the objects 17 to the serial feed conveyor system 26' to the object processing gap g2. The gap adjustment (g1→g2) can be achieved by proper settings of the lengths, L and L', of the object reciprocating drums, 29 and 29' respectively, and/or by adjusting their angular velocities, V and V'.

FIGS. 11A and 11B show configurations of a serial feed conveyor system 26' according to some possible embodiments, wherein the orientations of the object reciprocating drum 29 and of the accumulator unit 22a requires twisting the carrier medium (e.g., chain carrier) 97 used therebetween. In this specific and non-limiting example a total of 90° twist of the carrier medium 97 is required, but other, greater or smaller, twist angles can be similarly implemented with such embodiments. In FIG. 11A a single 90° twist of the carrier medium 97 is affected by applying a carrier extension of length d1 sufficient to permit the 90° twist and coupling the carrier medium 97 to a sprocket wheel 95 which axis of rotation is substantially perpendicular to the axis of rotation of the object reciprocating drum 29. The medium carrier 97 is then directed towards the accumulator 22a, which may require an additional extension of the carrier medium, thus requiring a total carrier medium extension of about d1 to 2*d1 (e.g., 180 to 400 cm).

In FIG. 11B a total of carrier medium 90° twist is affected by affecting two 45° twists of the carrier medium between the object reciprocating drum 29 and of the accumulator unit 22a. The first 45° twist is affected by a medium extension of length d2 sufficient to permit the 45° twist and coupling the carrier medium 97 to a sprocket wheel 96 which axis of rotation is 45° tilted relative to the axis of rotation of the carrier loader system 29. A second 45° twist of the carrier medium is affected by another carrier medium extension extending between the sprocket wheel 96 and the accumulator unit 22a. Accordingly, a total carrier medium extension of about d2 to 2*d2 is required but since each extension is required for a 45° twist the extension length d2 can be about 50% shorter than the extension length d1 required for the 90° twist exemplified in FIG. 11A (e.g., the total carrier extension can be about 180 to 200 cm).

Terms such as top, bottom, front, back, right, and left and similar adjectives in relation to orientation of the elements and components disclosed herein refer to the manner in which the illustrations are positioned on the paper, not as any limitation to the orientations in which the apparatus can be used in actual applications. It should also be understood that throughout this disclosure, where a process or method is shown or described, the steps of the method may be performed in any order or simultaneously, unless it is clear from the context that one step depends on another being performed first.

Functions of the system(s) described hereinabove may be controlled through instructions executed by a computer-based control unit/system (28 in FIG. 1). A control system suitable for use with embodiments described hereinabove may include, for example, one or more processors (28c) connected to a communication bus, one or more volatile memories (e.g., random access memory—RAM) or non-volatile memories (e.g., Flash memory). A secondary memory (e.g., a hard disk drive, a removable storage drive, and/or removable memory chip such as an EPROM, PROM or Flash memory) may be used for storing data, computer programs/modules, or other instructions, to be loaded into the computer system.

As will be appreciated by one skilled in the art, aspects of the present invention may be embodied as a system, method or computer program product. Accordingly, aspects of the present invention may take the form of an entirely hardware embodiment, or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As described hereinabove and shown in the associated figures, the present invention provides system(s) for interfacing between conveyors, and related methods. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:

1. A system for interfacing between different types of conveyors, wherein said conveyors comprise a first serial conveyor system using a sequence of object carriers configured to transport a continuous serial stream of objects, and a parallel conveyor system configured to simultaneously transport one or more arrays of objects, the system comprising:
- a first accumulator unit configured to accumulate a batch of the object carriers of said first serial conveyor system by temporarily and locally stopping movement of a portion of said continuous serial stream of objects including said batch of the object carriers, without interrupting the continuous movement of other portion thereof, each of said object carriers carrying an object of said continuous serial stream of objects for accumulating a batch of said objects therein; and
- one or more first movable trays, each configured to receive an array of said objects from the batch of objects accumulated in said first accumulator unit, transfer the received array of objects to the parallel conveyor system, and load the objects thereby carried onto grippers of the parallel conveyor system.

2. The system of claim 1 comprising a second accumulator unit configured to accumulate a batch of object carriers of a second serial conveyor system, or more second movable trays, each configured to receive an array of objects removed from the grippers of the parallel conveyor system and place the received objects on the batch of object carriers accumulated in said second accumulator unit.

3. The system of claim 1 comprising a spacing system configured to change the size of gaps between adjacently located objects to be transferred to the parallel conveyor system, or to be transferred from the parallel conveyor system.

4. The system of claim 3 wherein the spacing system comprises a first spacer unit configured to remove the batch of objects from the first accumulator unit, change the size of gaps between adjacently located objects in said batch of objects to a gap size dictated by said parallel conveyor system, and transfer the batch of objects with said dictated gap size to the one or more first movable trays.

5. The system of claim 4 wherein the first spacer unit is configured to apply attraction forces over the objects for attaching them thereto.

6. The system of claim 5 wherein the one or more first movable trays are configured to translate to a position substantially underneath the first spacer unit, and the spacer unit is configured to stop the attraction forces thereby applied to release the objects onto said or more first movable trays positioned therebeneath.

7. The system of claim 2 comprising one or more collector units, each collector unit configured to remove an array of objects from the grippers of the parallel conveyor system and transfer the removed array of objects to a respective one of the one or more second movable trays.

8. The system of claim 7 wherein the one or more collector units are configured to apply attraction forces over the objects for attaching them thereto.

9. The system of claim 8 wherein the one or more second movable trays are configured to translate to a position substantially underneath the one or more collector units, and said one or more collector units configured to stop the attraction forces applied over the objects thereby carried to release the carried objects onto said one or more second movable trays.

10. The system of claim 2 wherein the parallel conveyor system comprises a plurality of support platforms, each support platform comprising two or more arrays of the grippers, each of the one or more first movable trays is configured to load an array of objects onto a respective one of the array of grippers of said support platform.

11. The system of claim 10 wherein each collector unit is configured to remove an array of objects from a respective array of grippers of the support platform.

12. The system of claim 10 wherein each support platform comprises two arrays of grippers arranged in two parallel rows, each row of grippers configured to receive an array of objects from a respective one of the first movable trays by placing one of said first movable trays having an array of objects held thereon anterior to the support platform, placing another one of said first movable trays having an array of objects held thereon posterior to the support platform, and moving said movable trays one towards the other, to thereby place each of the objects carried by said first movable trays onto a respective gripper.

13. The system of claim 12 wherein the one or more collector units are configured to remove the arrays of objects held on the grippers by placing one of said collector units above one array of grippers of the support platform, placing another one of said collector units above the other array of grippers of the support platform, applying by said collector units attraction forces over the objects held by said grippers to attach them thereto, and moving said collector units in opposite direction one away from the other to remove said objects from said grippers.

14. The system of claim 1 comprising one or more sensor units configured to generate signals/data indicative of operational states and/or conditions in the system, and a control unit configured and operable to process the signals/data generated by said sensor units and generate corresponding control signals for at least causing the one or more first movable trays to receive the batch of objects accumulated in the first accumulator unit and transfer it to the parallel conveyor system.

15. The system of claim 10 comprising one or more sensor units configured to generate signals/data indicative of operational states and/or conditions in the system, and a control unit configured and operable to process the signals/data generated by said sensor units and generate corresponding control signals for at least causing the collector units to remove the arrays of objects from the grippers, the second movable trays to receive the objects from said collector units and transfer them to the second accumulator unit.

16. The system of claim 15 wherein the control unit is configured and operable to generated control signals for moving each of the collector units to a position above a respective array of grippers of a support platform and for concurrently placing each of the first moving trays with the array of objects placed thereon in a position adjacent and slightly below a respective array of grippers of said support platform, applying attraction forces by said collector units over objects held by the grippers, moving said collector units in opposite sideway directions one away from the other to remove the objects from the grippers, moving said object collectors and said first moving trays, with the array of objects thereby carried, upwardly to position the object collectors in an object release location and each of the first moving trays in front of a respective array of grippers for placing the arrays of objects thereby carried thereover.

17. The system of claim 14, wherein the control unit is configured and operable to carry out angular registration of the objects placed over the grippers of a support platform.

18. The system of claim 3 wherein the spacing system comprises a first reciprocating conveyor system and one or more carrier unloader systems, each configured to receive a serial stream of objects form a respective serial supply conveyor system and place the received objects on said first reciprocating conveyor system at one lateral side thereof, said first reciprocating conveyor system configured to convey the objects longitudinally thereover and move said objects to an opposite lateral side thereof for placing them over object carriers of the first serial conveyor system, and to thereby adjust spacing/gaps between the objects carried by said one or more serial supply conveyor systems to spacing/gaps of said first serial conveyor system.

19. The system of claim 3 wherein the spacing system comprises a second reciprocating conveyor system and a carrier unloader system configured to receive a serial stream of treated objects form the second serial conveyor system, and place the received objects on said second reciprocating conveyor system at one lateral side thereof, said second reciprocating conveyor system configured to convey the objects longitudinally thereover and move said objects to an opposite lateral side thereof for placing them over object carriers of an auxiliary serial conveyor system, to thereby adjust spacing/gaps between the objects carried by said second serial conveyor system to spacing/gaps of said auxiliary serial conveyor system.

20. The system of claim 3 wherein the spacing system comprises a first object reciprocating drum system configured to remove the objects from a serial supply conveyor system, and at least one additional object reciprocating drum system configured to receive the objects from said first object reciprocating drum system and place them on object carriers of the first serial conveyor system, thereby adjusting spacing/gaps between the objects.

21. The system of claim 20 wherein the adjusting spacing/gaps between the objects is affected by selection of a length of at least one of the object reciprocating drum systems, or of an angular velocity thereof.

22. The system of claim 20 comprising a control unit configured and operable to adjust the spacing/gaps between the objects by control of angular velocity of at least one of the object reciprocating drum systems.

23. A method for interfacing between different types of conveyors, the method comprising accumulating a batch of objects delivered by object carriers of a first serial conveyor system by temporarily and locally stopping movement of a portion of said serial conveyor including said batch of objects, without interrupting continuous movement of other portion thereof, each of said object carriers carrying an object, removing the accumulated batch of objects from said first serial conveyor system and placing them on one or more first movable trays, each configured to receive an array of said objects, translating the received array of objects to a parallel conveyor system, and loading said one or more arrays of objects onto object holders of said parallel conveyor system for simultaneous transportation of the one or more arrays of objects by said parallel conveyor system.

24. The method of claim 23 comprising accumulating a batch of object carriers of a second serial conveyor system, removing one or more arrays of objects from the object holders of the parallel conveyor system and placing them on one or more second movable trays, moving said one or more second movable trays towards said second serial conveyor system and placing the one or more arrays of objects on the accumulated batch of object carriers.

25. The method of claim 23 comprising changing size of gaps between adjacently located objects to be transferred to the parallel conveyor system, or to be transferred from the parallel conveyor system.

26. The method of claim 25 wherein the changing of the size of the gaps is carried out when removing the batch of objects from the first serial conveyor system, and the method comprising transferring the batch of objects with the dictated gap size to the one or more first movable trays.

27. The method of claim 26 wherein the removing of the objects comprises applying attraction forces over the objects and moving them away from object carriers of said first serial conveyor system, positioning the one or more first movable trays substantially underneath the removed objects, and stopping the attraction forces to release the objects onto said one or more first movable trays.

28. The method of claim 23 wherein the removing of the one or more arrays of objects from the parallel conveyor system comprises applying attraction forces over said objects, moving said one or more arrays of objects away from the object holders of said parallel conveyor system, translating the one or more second movable trays to a position substantially underneath said objects, and stopping the attraction forces applied over the objects to release them onto said one or more second movable trays.

29. The method of claim 28 wherein the parallel conveyor system comprises a plurality of support platforms, each support platform comprising one or more arrays of the object holders, the method comprising moving each of the one or more first movable trays towards a respective array of object holders and loading the array of objects thereby carried onto said respective array of object holders of said support platform.

30. The method of claim 29 wherein each support platform comprises two arrays of the object holders arranged in two parallel rows, each row of object holders configured to receive an array of objects from a respective one of the first movable trays, the method comprising placing one of said first movable trays having an array of objects held thereon anterior to the support platform, placing another one of said first movable trays having an array of objects held thereon posterior to the support platform, and moving said movable trays one towards the other, to thereby place each of the objects carried by said first movable trays onto a respective object holder.

31. The method of claim 30 wherein the removing of the arrays of objects from the object holders comprises applying the attraction forces over each of said arrays of objects and moving said array of objects in directions opposite one to the other to remove said objects from said object holders.

32. The method of claim 30 wherein the removing of the arrays of objects from the objects holders of the support platform is carried out in parallel with the loading of new objects over said object holders.

33. The method of claim 32 comprising moving each of the collector units to a position above a respective array of object holders of a support platform and concurrently, or shortly before, placing each of the first moving trays with array of new objects placed thereon in a position adjacent and slightly below a respective array of object holders of said support platform, applying attraction forces by said collector units over objects held by the object holders, moving said collector units in opposite sideway directions one away from the other to remove the objects from the object holders, moving said object collectors and said first moving trays, with the array of objects thereby carried, upwardly to position the object collectors in an object release location and each of the first moving trays in front of a respective array of object holders for placing the arrays of objects thereby carried thereover.

34. The method of claim 30 comprising immobilizing the objects placed over one row of the object holders while rotating the objects placed over another row of the object holders, and stopping the rotation of each one of said objects when it is angularly aligned with a respective one of said immobilized objects.

35. The method of claim 25 wherein the objects are received from one more serial feed conveyor systems, the method comprising removing the objects from said one more serial feed conveyor systems and placing them on a first reciprocating conveyor system at one lateral side thereof, conveying the objects longitudinally over said first reciprocating conveyor system and moving them to an opposite lateral side thereof for placing them over object carriers of the first serial conveyor system and thereby adjusting spacing/gaps between the objects carried by said one or more serial feed conveyors to spacing/gaps of said first serial conveyor system.

36. The method of claim 35 comprising at least one of controlling conveying velocity of the first reciprocating conveyor system and adjusting a side-to-side movement length of the objects thereover, for adjusting the spacing/gaps between the objects placed over the object carriers of the first serial conveyor system.

37. The method of claim 25, wherein the objects are moved from the second serial conveyor system to an auxiliary serial conveyor system having a different spacing/gaps between its object carriers, the method comprising removing objects received from said second serial conveyor system and placing them on a second reciprocating conveyor system at one lateral side thereof, conveying the objects longitudinally over said reciprocating conveyor system and moving them to an opposite lateral side thereof for placing them over the object carriers of said auxiliary serial conveyor system, thereby adjusting spacing/gaps between the objects carried by said second serial conveyor system to spacing/gaps of said auxiliary serial conveyor system.

38. The method of claim 34 comprising at least one of controlling conveying velocity of the second reciprocating conveyor system and adjusting a side-to-side movement length of the objects thereover, for adjusting the spacing/gaps between the objects placed over the object carriers of the auxiliary serial conveyor system.

39. The method of claim 25 comprising providing a first object reciprocating drum system and at least one additional object reciprocating drum system, removing the objects from a serial supply conveyor system by said first object reciprocating drum system, transferring the objects from said first object reciprocating drum system to said second object reciprocating drum system, and placing the objects transferred to said second object reciprocating drum system on object carriers of the first serial conveyor system, thereby adjusting spacing/gaps between the objects.

40. The method of claim 39 comprising adjusting the spacing/gaps between the objects by control of angular velocity of at least one of the object reciprocating drum systems.

* * * * *